(12) United States Patent
You

(10) Patent No.: US 12,512,181 B2
(45) Date of Patent: Dec. 30, 2025

(54) MEMORY DEVICE PERFORMING TARGET REFRESH OPERATION AND OPERATING METHOD THEREOF

(71) Applicant: SK hynix Inc., Gyeonggi-do (KR)

(72) Inventor: Jung Taek You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 324 days.

(21) Appl. No.: 18/295,851

(22) Filed: Apr. 5, 2023

(65) Prior Publication Data

US 2024/0161861 A1 May 16, 2024

(30) Foreign Application Priority Data

Nov. 11, 2022 (KR) .................. 10-2022-0150652

(51) Int. Cl.
*G11C 29/44* (2006.01)
*G11C 29/00* (2006.01)

(52) U.S. Cl.
CPC ............ *G11C 29/802* (2013.01); *G11C 29/44* (2013.01); *G11C 29/789* (2013.01)

(58) Field of Classification Search
None
See application file for complete search history.

(56) References Cited

U.S. PATENT DOCUMENTS

| 9,087,554 B1 | 7/2015 | Park |
| 2020/0349995 A1 | 11/2020 | Shore et al. |
| 2023/0021622 A1* | 1/2023 | Cho .................... G11C 11/4078 |

FOREIGN PATENT DOCUMENTS

KR  10-2023-0035881 A  3/2023

* cited by examiner

*Primary Examiner* — Alfredo Bermudez Lozada
(74) *Attorney, Agent, or Firm* — IP & T GROUP LLP

(57) ABSTRACT

A memory device includes: a memory cell region including normal cells coupled to normal column selection lines, and row-hammer cells and redundancy cells respectively coupled to redundancy column selection lines; a repair control circuit configured to provide repair addresses and row-hammer flag signals, corresponding to repair information, according to a row address; and a column control circuit configured to activate at least one of the redundancy column selection lines according to the row-hammer flag signals or a comparison result of a column address and the repair addresses.

15 Claims, 17 Drawing Sheets

MEMORY DEVICE PERFORMING TARGET REFRESH OPERATION AND OPERATING METHOD THEREOF

CROSS-REFERENCE TO RELATED APPLICATION

The present application claims the benefit of Korean Patent Application No. 10-2022-0150652, filed on Nov. 11, 2022, which is incorporated herein by reference in its entirety.

BACKGROUND

1. Field

Various embodiments of the present invention relate to a semiconductor design technology, and more particularly, to a semiconductor memory device that performs a target refresh operation.

2. Description of the Related Art

Recently, in addition to a normal refresh operation for sequentially refreshing a plurality of word lines, an additional refresh operation which will be hereinafter referred to as a 'target refresh operation', is being performed on memory cells of a specific word line that is likely to lose data due to row hammering. The row hammering phenomenon refers to a phenomenon in which data of memory cells coupled to a specific word line or neighboring word lines disposed adjacent to the specific word line are damaged due to a high number of activations of the specific word line. In order to prevent the row hammering phenomenon, a target refresh operation is performed on a word line that is activated more than a predetermined number of times, and neighboring word lines disposed adjacent to the word line.

SUMMARY

Embodiments of the present invention are directed to a memory device capable of allocating memory cells coupled to unused columns for a redundancy cell area which is used to repair a normal cell area that includes row-hammer cells and selecting a target address according to an access counting value of each row stored in the allocated row-hammer cells.

According to an embodiment of the present invention, a memory device includes a memory cell region including normal cells coupled to normal column selection lines, and row-hammer cells and redundancy cells respectively coupled to redundancy column selection lines; a repair control circuit configured to provide repair addresses and row-hammer flag signals, corresponding to repair information, according to a row address; and a column control circuit configured to activate at least one of the redundancy column selection lines according to the row-hammer flag signals or a comparison result of a column address and the repair addresses.

According to an embodiment of the present invention, a memory device includes a memory cell region including normal column selection lines and redundancy column selection lines, and in which memory cells coupled to unused redundancy column selection lines for repair among the redundancy column selection lines are allocated to row-hammer cells; and a refresh control circuit configured to select a target address based on access counting data provided from the row-hammer cells, and update the access counting data to write-back the updated access counting data to the row-hammer cells, during a row-hammer tracking mode.

According to an embodiment of the present invention, an operating method of a memory device includes outputting repair information stored in a nonvolatile storage device as fuse array data according to a fuse address during boot-up; providing the fuse array data as a plurality of fuse data items and a plurality of flag data items according to the fuse address, while activating the flag data items and masking the fuse array data when it is detected that the fuse array data includes unused data; and respectively storing the plurality of fuse data items and the plurality of flag data items in a plurality of latch circuits.

According to an embodiment of the present invention, an operating method of a memory device includes storing repair addresses and row-hammer flag signals corresponding to redundancy column selection lines, based on repair information during boot-up, while setting a corresponding row-hammer flag signal without storing a repair address corresponding to an unused redundancy column selection line among the redundancy column selection lines; selecting one of the redundancy column selection lines according to the row-hammer flag signals, and reading access counting data from row-hammer cells coupled to the selected redundancy column selection line, during a row-hammer tracking mode; and selecting a target address based on the access counting data, and updating the access counting data to write-back the updated access counting data to the row-hammer cells.

According to an embodiment of the present invention, a memory device includes a memory cell region including normal memory cells coupled to normal column selection lines and redundancy memory cells coupled to redundancy column selection lines, the redundancy memory cells including repair memory cells and row-hammer memory cells; and a refresh control circuit configured to, during a row-hammer tracking mode: read data from the row-hammer memory cells; perform an error correction on the data to generate error-corrected data; determine whether the error-corrected data has a set value exceeding a threshold value; determine a target address corresponding to the error-corrected data according to a determination that the error-corrected data has the set value; and perform a refresh operation on one or more rows adjacent to a row corresponding the target address.

Further, according to embodiments of the present invention, the memory cells coupled to the unused columns in the redundancy cell area may be utilized as the row-hammer cells, thereby increasing the utilization of the redundancy cell area without adding a separate row hammer area. In addition, by selecting the target address according to the access counting value stored in the row-hammer cells, it is possible to optimize the row hammer defense capability and minimize the power consumption. In addition, it is possible to improve the accuracy and refresh efficiency of the refresh operation by performing the target refresh operation according to the target address.

DETAILED DESCRIPTION

Figure 1:
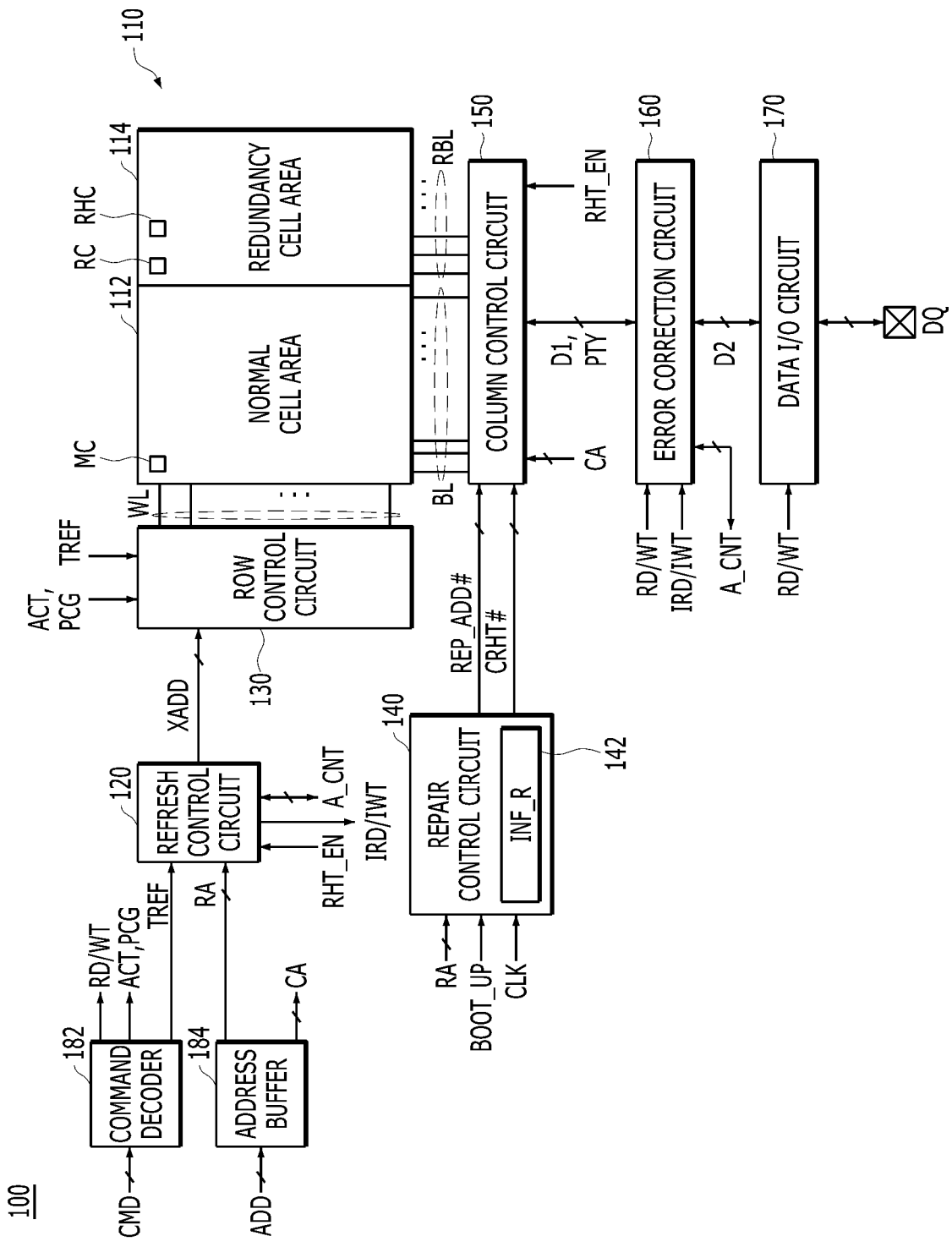
FIG. 1 is a block diagram illustrating a memory device in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present invention.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

Figure 2A:
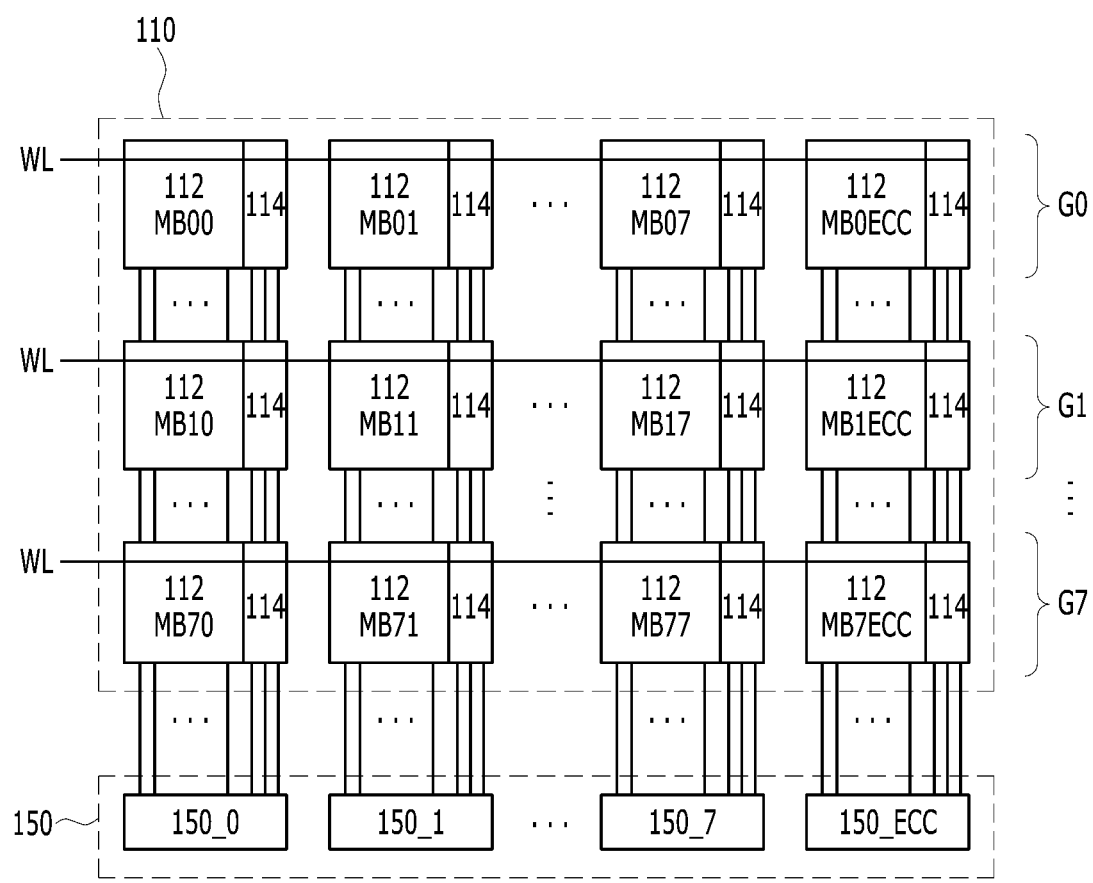
FIGS. 2A and 2B are a schematic diagram illustrating an arrangement of a memory cell region of FIG. 1 in accordance with an embodiment of the present invention.
Figure 2B:
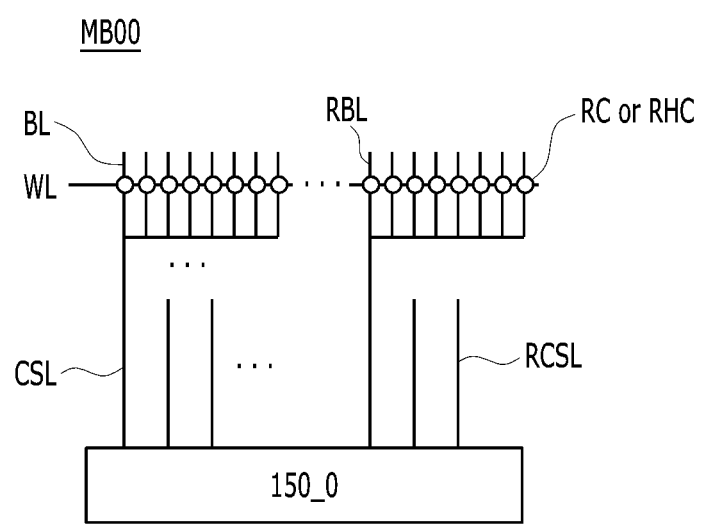

FIG. 1 is a block diagram illustrating a memory device 100 in accordance with an embodiment of the present invention. FIGS. 2A and 2B are a schematic diagram illustrating an arrangement of a memory cell region of FIG. 1 in accordance with an embodiment of the present invention.

Referring to FIG. 1, the memory device 100 may include a memory cell region 110, a refresh control circuit 120, a row control circuit 130, a repair control circuit 140, a column control circuit 150, an error correction circuit 160, a data input/output (I/O) circuit 170, a command decoder 182, and an address buffer 184.

The command decoder 182 may receive a command CMD, and the address buffer 184 may receive an address ADD, from an external device (e.g., a memory controller). The command decoder 182 may decode the command CMD to generate an active command ACT, a precharge command PCG, a target refresh command TREF, a read command RD, and a write command WT. The command decoder 182 may generate a normal refresh command, a mode register set (MRS) command and other commands, by decoding the command CMD. The address buffer 184 may buffer the address ADD to output a row address RA and a column address CA. Each of the command CMD and the address ADD may include a multi-bit signal.

The memory cell region 110 may include a plurality of memory cells MC, RC and RHC, which are arranged in an array type and coupled to a plurality of word lines WL (hereinafter, referred to as rows) and a plurality of bit lines BL and RBL (hereinafter, referred to as columns). The rows WL may be extended into a first direction (e.g., a row direction), and are sequentially arranged in a second direction (e.g., a column direction). The columns BL and RBL may be extended into the column direction and are sequentially arranged in the row direction. Depending on an embodiment, the memory cell region 110 may include a plurality of cell blocks. In accordance with an embodiment, the "cell block" may be defined as a set of memory cells that share the rows WL and the columns BL and RBL and are arranged in the same array type. The number of cell blocks or the number of memory cells may be determined according to the capacity of the memory device 100.

In accordance with an embodiment, the memory cell region 110 may be divided into a normal cell area 112 and a redundancy cell area 114. In the normal cell area 112, a plurality of normal cells MC may be arranged in an array type. In the redundancy cell area 114, a plurality of redundancy cells RC and a plurality of row-hammer cells RHC may be arranged in an array type. The plurality of normal cells MC, the plurality of redundancy cells RC, and the plurality of row-hammer cells RHC may be coupled to each of the rows WL. The plurality of normal cells MC may store normal data including user data. The plurality of redundancy cells RC may be cells for replacing defective cells among the normal cells MC. The plurality of row-hammer cells RHC may store access counting data A_CNT representing the number of accesses to a corresponding row. Hereinafter, a plurality of columns BL connected to the normal cell area 112 are referred to as "normal columns", and a plurality of columns RBL connected to the redundancy cell area 114 are referred to as "redundancy columns".

Referring to FIG. 2A, the memory cell region 110 may include a plurality of cell blocks MB00 to MB07, MB10 to MB17, . . . MB70 to MB77, and MB0ECC to MB7ECC, arranged in an array form in a row direction and a column direction. For example, in FIG. 2A, nine cell blocks MB00 to MB07 and MB0ECC arranged in the row direction constitute a first group G0, nine cell blocks MB10 to MB17 and MB1ECC arranged in the next row direction constitute a second group G1, and in this way, nine cell blocks MB70 to MB77 and MB7ECC arranged in the row direction constitute an eighth group G7. That is, the first to eighth groups G0 to G7 may be sequentially disposed in the column direction, and cell blocks in each group may be sequentially disposed in the row direction. Cell blocks included in the same group may share the rows WL, and cell blocks disposed at a same column side of respective groups may share the columns BL and RBL. The column control circuit 150 may include a plurality of column control parts 150_0 to 150_ECC. Each of the column control parts 150_0 to 150_ECC may correspond to the cell blocks disposed at the same column side, and be coupled to the corresponding cell blocks through the shared columns BL and RBL.

Since the cell blocks of each group have the same configuration, the first group G0 will be used as an example. The cell blocks MB00 to MB07 and MB0ECC in the first group G0 may include a plurality of normal cell blocks MB00 to MB07 and an error correction code (ECC) cell block MB0ECC. The normal cell blocks MB00 to MB07 may store or output data (D1 of FIG. 1) received from the external device through the column control parts 150_0 to 150_7 and the data I/O circuit 170. The normal cell blocks MB00 to MB07 may be an area for storing user data, and determine the memory capacity of the memory device 100. The ECC cell block MB0ECC may store or output an error correction code (PTY of FIG. 1) generated from the error correction circuit 160, through the column control part 150_ECC. The error correction code PTY may include known parity bits. Each of the cell blocks MB00 to MB07 and MB0ECC may include the normal cell area 112 and the redundancy cell area 114 of FIG. 1. That is, each of the cell blocks MB00 to MB07 and MB0ECC may include a plurality of memory cells MC, RC, and RHC arranged in an array form between a plurality of rows WL and a plurality of columns BL and RBL.

Referring to FIG. 2B, a configuration of a cell block (e.g., cell block MB00) is illustrated. In the normal cell area 112, the normal cells MC coupled to the rows WL and the normal columns BL may be arranged in an array form. In the redundancy cell area 114, the redundancy cells RC and the row-hammer cells RHC respectively coupled to the rows WL and the redundancy columns RBL may be arranged in an array form. Moreover, a predetermined number (e.g., 8 columns) of columns BL and RBL may be coupled to one column selection line CSL and RCSL, and the column control part 150_0 may simultaneously select the predetermined number by selecting at least one column selection line CSL and RCSL according to the column address CA. Accordingly, 64-bit data D1 and 8-bit error correction code PTY may be simultaneously read or written from the cell blocks MB00 to MB07 and MB0ECC of the first group G0.

Hereinafter, the column selection lines CSL coupled to the normal columns BL are referred to as "normal column selection lines", and the column selection lines RCSL coupled to the redundancy columns RBL are referred to as "redundancy column selection lines". In an embodiment, each cell block of the memory cell region 110 may include the normal cells MC coupled to the normal column selection lines CSL, and the redundancy cells RC and the row-hammer cells RHC respectively coupled to the redundancy column selection lines RCSL.

Among the redundancy column selection lines RCSL of the redundancy cell area 114, memory cells coupled to redundancy column selection lines that are not used for repair (hereinafter, referred to as row-hammer column selection lines) may be allocated to the row-hammer cells RHC, and the access counting data A_CNT corresponding to the number of accesses for each row may be stored in the assigned row-hammer cells RHC.

Referring back to FIG. 1, the refresh control circuit 120 may select the row address RA as a target address (TADD of FIG. 3) based on the access counting data A_CNT provided from the row-hammer cells RHC during a row-hammer tracking mode. The refresh control circuit 120 may operate according to a tracking signal RHT_EN that is activated during the row-hammer tracking mode and deactivated during a normal mode. In an embodiment, the tracking signal RHT_EN may be activated after a predetermined time from an input of the active command ACT and may be deactivated before the read command RD or the write command WT is input. That is, the refresh control circuit 120 may receive the access counting data A_CNT read from the row-hammer cells RHC coupled to rows activated by the active command ACT during the row-hammer tracking mode. According to an embodiment, the tracking signal RHT_EN may be generated internally according to the active command ACT or may be provided from the external device after a predetermined time from the input of the active command ACT.

The refresh control circuit 120 may output the target address TADD or the row address RA as a final row address XADD according to the target refresh command TREF. In addition, the refresh control circuit 120 may update the access counting data A_CNT during the row-hammer tracking mode to write-back the access counting data A_CNT to the row-hammer cells RHC. The refresh control circuit 120 may sequentially issue an internal read signal IRD and an internal write signal IWT for reading and writing-back the access counting data A_CNT from and to the row-hammer cells RHC. A detailed configuration of the refresh control circuit 120 will be described in detail with reference to FIG. 3.

The row control circuit 130 may be coupled to the normal cells MC of the normal cell area 112, and the redundancy cells RC and the row-hammer cells RHC of the redundancy cell area 114 through the rows WL. The row control circuit 130 may activate a row corresponding to the final row address XADD when the active command ACT is activated, and may precharge the activated row when the precharge command PCG is activated. The row control circuit 130 may perform a target refresh operation of refreshing one or more rows adjacent to a target row corresponding to the final row address XADD according to the target refresh command TREF.

The repair control circuit 140 may include a nonvolatile storage circuit 142 that stores repair information INF_R on defective addresses of cell blocks. The nonvolatile storage circuit 142 may store the repair information INF_R without losing it even when the power is turned off. The repair control circuit 140 may store the repair information INF_R from the nonvolatile storage circuit 142 to internal latch circuits (145_1 to 145_3 of FIG. 4) according to a boot-up signal BOOT_UP and a clock signal CLK during boot-up. The repair control circuit 140 may provide repair addresses REP_ADD# and row-hammer flag signals CRHT#, corresponding to the repair information INF_R stored in the latch circuits 145_1 to 145_3, according to the row address RA.

In an embodiment, the repair addresses REP_ADD# may correspond to column addresses for designating column selection lines to which defective cells are coupled, among the normal column selection lines. The repair addresses REP_ADD# and the row-hammer flag signals CRHT# may be provided for as many as the number corresponding to the number of the redundancy column selection lines RCSL of the redundancy cell area 114. Hereinafter, a case in which three redundancy column selection lines RCSL are provided for each cell block will be described as an example. At this time, the reference numeral "#" may be defined as a natural number from 1 to 3.

Since the cell blocks of each group share the same rows WL and simultaneously output the stored data, the same defect address for each group may be stored as the repair information INF_R. Therefore, the repair control circuit 140 may provide the repair addresses REP_ADD# and the row-hammer flag signals CRHT# corresponding to the repair information INF_R stored in the latch circuits 145_1 to 145_3 according to predetermined bits of the row address RA for specifying each group. In particular, in an embodiment, the repair control circuit 140 may store the repair addresses REP_ADD# respectively corresponding to the redundancy column selection lines RCSL based on the repair information INF_R during boot-up, while setting a corresponding row-hammer flag signal to a logic high level without storing a repair address corresponding to an unused redundancy column selection line. The detailed configuration and operation of the repair control circuit 140 will be described in detail with reference to FIGS. 4 to 8.

The column control circuit 150 may be coupled to the normal cells MC of the normal cell area 112 through the normal columns BL, and coupled to the redundancy cells RC and the row-hammer cells RHC of the redundancy cell area 114 through the redundancy columns RBL. The column control circuit 150 may select and activate at least one of the redundancy column selection lines RCSL according to the row-hammer flag signals CRHT#, or a comparison result of the column address CA and the repair addresses REP_ADD#, in response to the tracking signal RHT_EN. During the normal mode in which the tracking signal RHT_EN is deactivated, the column control circuit 150 may select at least one of the normal column selection lines CSL by decoding the column address CA during the normal mode, while performing a repair operation of selecting a corresponding redundancy column selection line RCSL instead of the normal column selection line CSL when the column address CA is identical to the repair addresses REP_ADD#. During the row-hammer tracking mode in which the tracking signal RHT_EN is activated, the column control circuit 150 may select and activate the row-hammer column selection line from the redundancy column selection lines RCSL according to the activated row-hammer flag signal CRHT# to thereby read and write-back the access counting data A_CNT from and to the row-hammer cells RHC coupled to the selected row-hammer column selection line. A detailed configuration of the column control circuit 150 will be described in detail with reference to FIGS. 9 and 10.

The error correction circuit 160 may transfer the data D1 and the error correction code PTY with the memory cell region 110, through the column control circuit 150. The error correction circuit 160 may generate the error correction code PTY using data D2 provided from the data I/O circuit 170 through data pads DQ according to the write command WT during a write operation. In addition, the error correction circuit 160 may correct an error of the data D1 provided from the memory cell region 110 using the error correction code PTY provided from the memory cell region 110 according to the read command RD during a read operation. The data D2 whose error is corrected by the error correction circuit 160 may be provided to the data I/O circuit 170.

In an embodiment, the error correction circuit 160 may generate the error correction code PTY using the updated access counting data A_CNT provided from the refresh control circuit 120 according to the internal write signal IWT. The error correction circuit 160 may correct an error of the data D1 provided from the memory cell region 110 using the error correction code PTY provided from the memory cell region 110 to output the access counting data A_CNT, according to the internal read signal IRD. Accordingly, the error correction circuit 160 may correct the error of the access counting data A_CNT during the row-hammer tracking mode.

The data I/O circuit 170 may transfer the data D2 with the external device through the data pads DQ. The data I/O circuit 170 may receive the data D2 from the external device according to the command WT during the write operation, and output the data D2 whose error is corrected, to the external device through the data pads DQ, according to the read command RD during the read operation.

Hereinafter, a detailed configuration of the memory device 100 according to an embodiment of the present invention will be described with reference to FIGS. 3 to 10.

Figure 3:
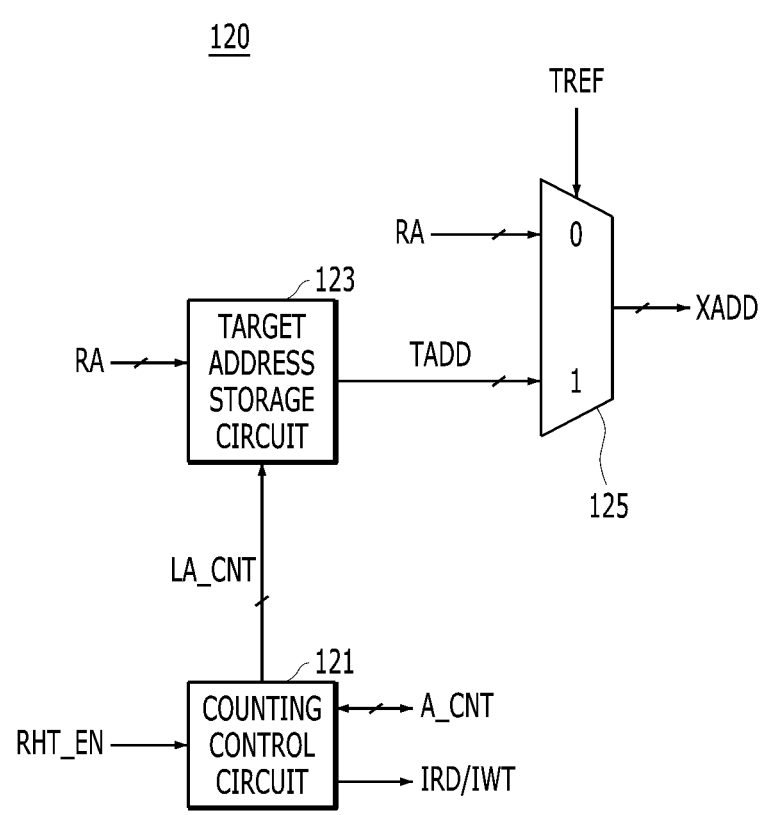
FIG. 3 is a detailed block diagram illustrating a refresh control circuit shown in FIG. 1 in accordance with an embodiment of the present invention.

FIG. 3 is a detailed block diagram illustrating the refresh control circuit 120 shown in FIG. 1 in accordance with an embodiment of the present invention.

Referring to FIG. 3, the refresh control circuit 120 may include a counting control circuit 121, a target address storage circuit 123, and a selection circuit 125.

The counting control circuit 121 may issue the internal read signal IRD to the error correction circuit 160 according to the tracking signal RHT_EN. The counting control circuit 121 may receive the access counting data A_CNT from the error correction circuit 160 after a predetermined delay time from the issuance of the internal read signal IRD. The counting control circuit 121 may provide the access counting data A_CNT as reference counting data LA_CNT to the target address storage circuit 123 and update the access counting data A_CNT. For example, the access counting data A_CNT includes 64-bit data having the same counting value for 8-bit each. The counting control circuit 121 may update the access counting data A_CNT by increasing a value of the access counting data A_CNT by "+1" in 8-bit units. The counting control circuit 121 may issue the internal write signal IWT and provide the updated access counting data A_CNT and the internal write signal IWT to the error correction circuit 160.

The target address storage circuit 123 may store the row address RA as the target address TADD when the reference counting data LA_CNT exceeds a preset threshold value.

The selection circuit 125 may output the stored target address TADD or the row address RA as the final row address XADD according to the target refresh command TREF. When the target refresh command TREF is input, the selection circuit 125 may output the target address TADD as the final row address XADD.

With the above configuration, during the row-hammer tracking mode, the refresh control circuit 120 may select the target address TADD based on the access counting data A_CNT provided from the row-hammer cells RHC, and update and write-back the access counting data A_CNT to the row-hammer cells RHC. In addition, the refresh control circuit 120 may output the row address RA as the final row address XADD, while outputting the target address ADD as the final row address XADD only when the target refresh command TREF is input.

Figure 4:
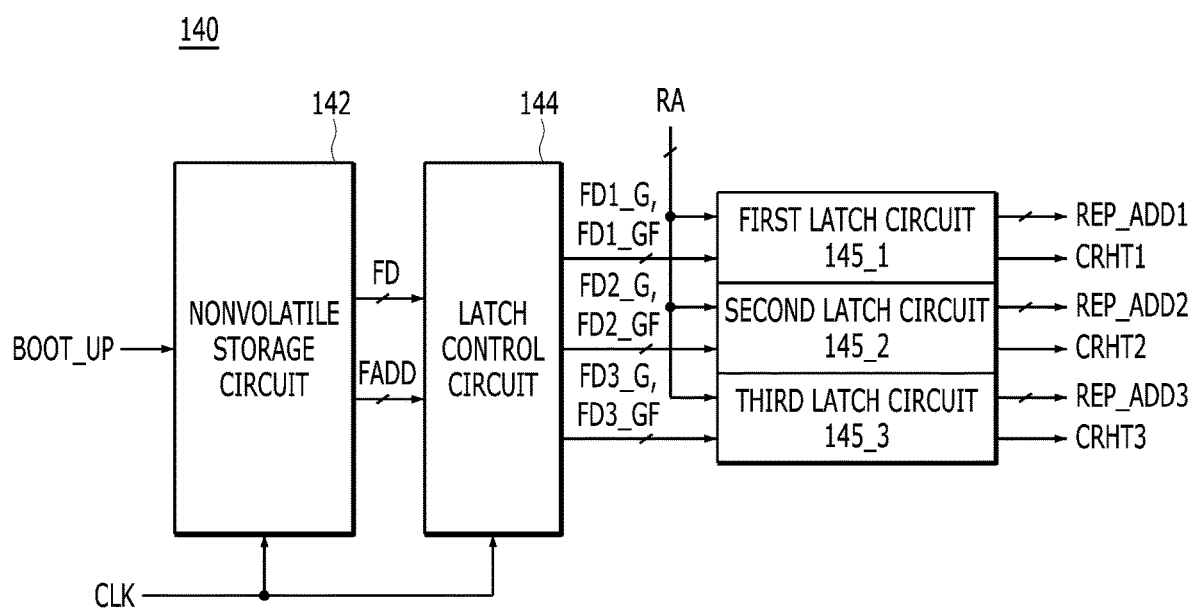
FIG. 4 is a detailed block diagram illustrating a repair control circuit shown in FIG. 1 in accordance with an embodiment of the present invention.

FIG. 4 is a detailed block diagram illustrating the repair control circuit 140 shown in FIG. 1 in accordance with an embodiment of the present invention.

Referring to FIG. 4, the repair control circuit 140 may include the nonvolatile storage circuit 142, a latch control circuit 144, and first to third latch circuits 145_1 to 145_3.

The nonvolatile storage circuit 142 may store the defect addresses of the cell blocks for each group as the repair information INF_R. Depending on an embodiment, the nonvolatile storage circuit 142 may be configured as one of an array e-fuse (ARE) circuit, a laser fuse circuit, a NAND flash memory, a NOR flash memory, a magnetic random access memory (MRAM), a spin transfer torque magnetic random access memory (STT-MRAM), a resistive random access memory (ReRAM) and a phase change random access memory (PCRAM). Hereinafter, a case in which the nonvolatile storage circuit 142 is an array e-fuse (ARE) circuit will be described as an example.

When the boot-up signal BOOT_UP is activated, the nonvolatile storage circuit 142 may generate a fuse address FADD for designating the first to eighth groups G0 to G7 according to the clock signal CLK, and sequentially output the pre-stored repair information INF_R as fuse array data FD according to the fuse address FADD. For example, when the fuse address FADD specifying the first group G0 is generated, the fuse array data FD for defective addresses of cell blocks disposed in the first group G0 may be sequentially output.

The nonvolatile storage circuit 142 may include a plurality of memory sets (i.e., fuse sets). Each fuse set may include an enable fuse and a plurality of address fuses. The enable fuse may program information on whether a corresponding fuse set is programming a valid address. The address fuses may include a plurality of fuse cells for programming bits of the defective address to thereby program the defective address. In an embodiment, the fuse array data FD may be output in units of bits corresponding to the enable fuse and the address fuses in synchronization with the clock signal CLK. In an embodiment, the fuse array data FD is output in units (e.g., (k+2) bits) of the enable bit (e.g., 1-bit) and the address bits (e.g., (k+1) bit) for each rising edge of the clock signal CLK.

The latch control circuit 144 may receive the fuse array data FD according to the fuse address FADD and the clock signal CLK, and provide first to third fuse data FD1_G to FD3_G and first to third flag data FD1_GF to FD3_GF to the first to third latch circuits 145_1 to 145_3, respectively. When it is detected that the fuse array data FD is unused data of an unused fuse set, the latch control circuit 144 may activate and provide the flag data to a corresponding latch circuit while masking the fuse array data FD so that it is not output as the fuse data.

The first to third latch circuits 145_1 to 145_3 may correspond to the redundancy column selection lines RCSL, and receive the first to third fuse data FD1_G to FD3_G and the first to third flag data FD1_GF to FD3_GF, respectively, to store latch data for the respective redundancy column lines. The first to third latch circuits 145_1 to 145_3 may select one of the stored latch data for groups according to predetermined bits of the row address RA, to output first to third repair addresses REP_ADD1 to REP_ADD3 and first to third row-hammer flag signals CRHT1 to CRHT3.

Figure 5:
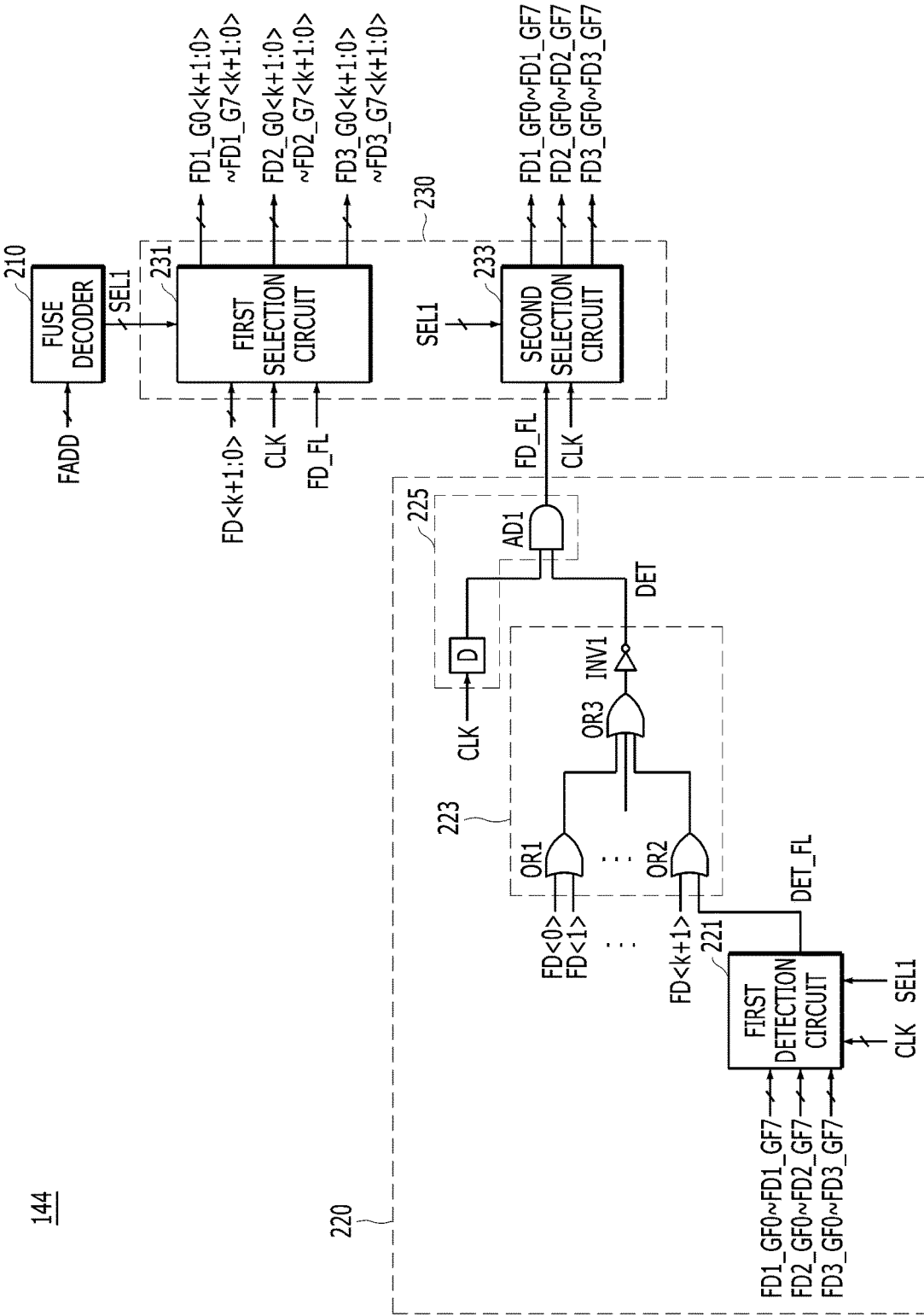
FIG. 5 is a circuit diagram illustrating a latch control circuit of FIG. 4.

FIG. 5 is a circuit diagram illustrating the latch control circuit 144 of FIG. 4.

Referring to FIG. 5, the latch control circuit 144 may include a fuse decoder 210, a tracking circuit 220, and a selection output circuit 230.

The fuse decoder 210 may generate a first selection signal SEL1 by decoding the fuse address FADD. The first selection signal SEL1 may include multi-bit (e.g., 3 bits) to designate one of the groups.

The tracking circuit 220 may activate a detection signal DET by detecting a case where a fuse set is not used without assigning a row-hammer column selection line in the same group, and output a preliminary flag signal FD_FL by synchronizing the detection signal DET with the clock signal CLK. That is, when it is first detected that the fuse set in the same group is not used, the tracking circuit 220 may output the preliminary flag signal FD_FL. The tracking circuit 220 may determine whether the row-hammer column selection line is assigned or not in the same group by verifying logic levels of the first flag data FD1_GF0 to FD1_GF7, the second flag data FD2_GF0 to FD2_GF7, and the third flag data FD3_GF0 to FD3_GF7 in response to the first selection signal SEL1 and the clock signal CLK. When all bits FD<k+1:0> of the fuse array data FD are at logic low levels bits, the tracking circuit 220 may determine that the fuse set has not been used since initialization.

In detail, the tracking circuit 220 may include a first detection circuit 221, a second detection circuit 223, and a synchronization circuit 225.

The first detection circuit 221 may detect the logic levels of the first flag data FD1_GF0 to FD1_GF7, the second flag data FD2_GF0 to FD2_GF7, and the third flag data FD3_GF0 to FD3_GF7 in response to the first selection signal SEL1 and the clock signal CLK. For example, when the first selection signal SEL1 specifying the first group G0 is input, the first detection circuit 221 may receive the first flag data FD1_GF0, the second flag data FD2_GF0 and the third flag data FD3_GF0, for the first group G0, according to the clock signal CLK, and output a flag detection signal DET_FL at a logic low level when all of the first flag data FD1_GF0, the second flag data FD2_GF0 and the third flag data FD3_GF0 are at logic low levels. On the other hand, the first detection circuit 221 may output the flag detection signal DET_FL at a logic high level when one of the first flag data FD1_GF0, the second flag data FD2_GF0 and the third flag data FD3_GF0 is at a logic high level. When the flag detection signal DET_FL is at a logic low level, it may be determined that the row-hammer column selection line is not assigned in the same group.

The second detection circuit 223 may generate the detection signal DET based on the flag detection signal DET_FL and bits FD<k+1:0> of the fuse array data FD. The second detection circuit 223 may activate the detection signal DET to a logic high level when all of the flag detection signal DET_FL and the bits FD<k+1:0> are at logic low level. On the other hand, the second detection circuit 223 may deactivate the detection signal DET to a logic low level when any of the flag detection signal DET_FL and the bits FD<k+1:0> is a logic high level. When the detection signal DET is activated to a logic high level, it may be determined that the fuse set has not been used when the row-hammer column selection line is not assigned in the same group. The second detection circuit 223 may include a plurality of OR gates OR1 to OR3 and an inverter INV1.

The synchronization circuit 225 may synchronize the detection signal DET with the clock signal CLK to output the preliminary flag signal FD_FL. The synchronization circuit 225 may include a delay circuit D and an AND gate AD1. The delay circuit D may delay the clock signal CLK for a predetermined delay time. The AND gate AD1 may perform a logic AND operation on an output of the delay circuit D and the detection signal DET. Accordingly, the synchronization circuit 225 may output the detection signal DET as the preliminary flag signal FD_FL in synchronization with the predetermined time delay of the clock signal CLK.

The selection output circuit 230 may include a first selection circuit 231 and a second selection circuit 233.

The first selection circuit 231 may output the fuse array data FD<k+1:0> as the first fuse data FD1_G0<k+1:0> to FD1_G7<k+1:0>, the second fuse data FD2_G0<k+1:0> to FD2_G7<k+0:0>, and the third fuse data FD3_G0<k+1:0> to FD3_G7<k+0:0>, according to the first selection signal SEL1 and the clock signal CLK, while masking the fuse array data FD<k+1:0> according to the preliminary flag signal FD_FL. For example, when the first selection signal SEL1 specifying the first group G0 is input, the first selection circuit 231 may sequentially output the fuse array data FD<k+1:0> as the first fuse data FD1_G0<k+1:0>, the second fuse data FD2_G0<k+1:0> and the third fuse data FD3_G0<k+1:0>, for the first group G0, according to the clock signal CLK.

The second selection circuit 233 may output the preliminary flag signal FD_FL as the first flag data FD1_GF0 to FD1_GF7, the second flag data FD2_GF0 to FD2_GF7, and the third flag data FD3_GF3 to FD3_GF7 according to the first selection signal SEL1 and the clock signal CLK. For example, when the first selection signal SEL1 specifying the first group G0 is input, the second selection circuit 233 may sequentially output the preliminary flag signal FD_FL as the first flag data FD1_GF0, the second flag data FD2_GF0 and the third flag data FD3_GF0, for the first group G0, according to the clock signal CLK. The second selection circuit 233 may output the first flag data FD1_GF0, the second flag data FD2_GF0, and the third flag data FD3_GF0, which are set according to an activation of the preliminary flag signal FD_FL, and reset according to the first selection signal SELL In an embodiment, the tracking circuit 220 may further include a detection circuit for detecting whether the corresponding fuse set is defective based on the bits FD<k+1:0> of the fuse array data. For example, the detection circuit may output a defective detection signal by detecting a case where the enable bit FD<k+1> corresponding to the enable fuse is a low bit, but two or more of the address fuses are set to high bits. The first selection circuit 231 may mask the fuse array data FD so as not to be output as the first to third fuse data FD1_G to FD3_G according to the defective detection signal.

Figure 6:
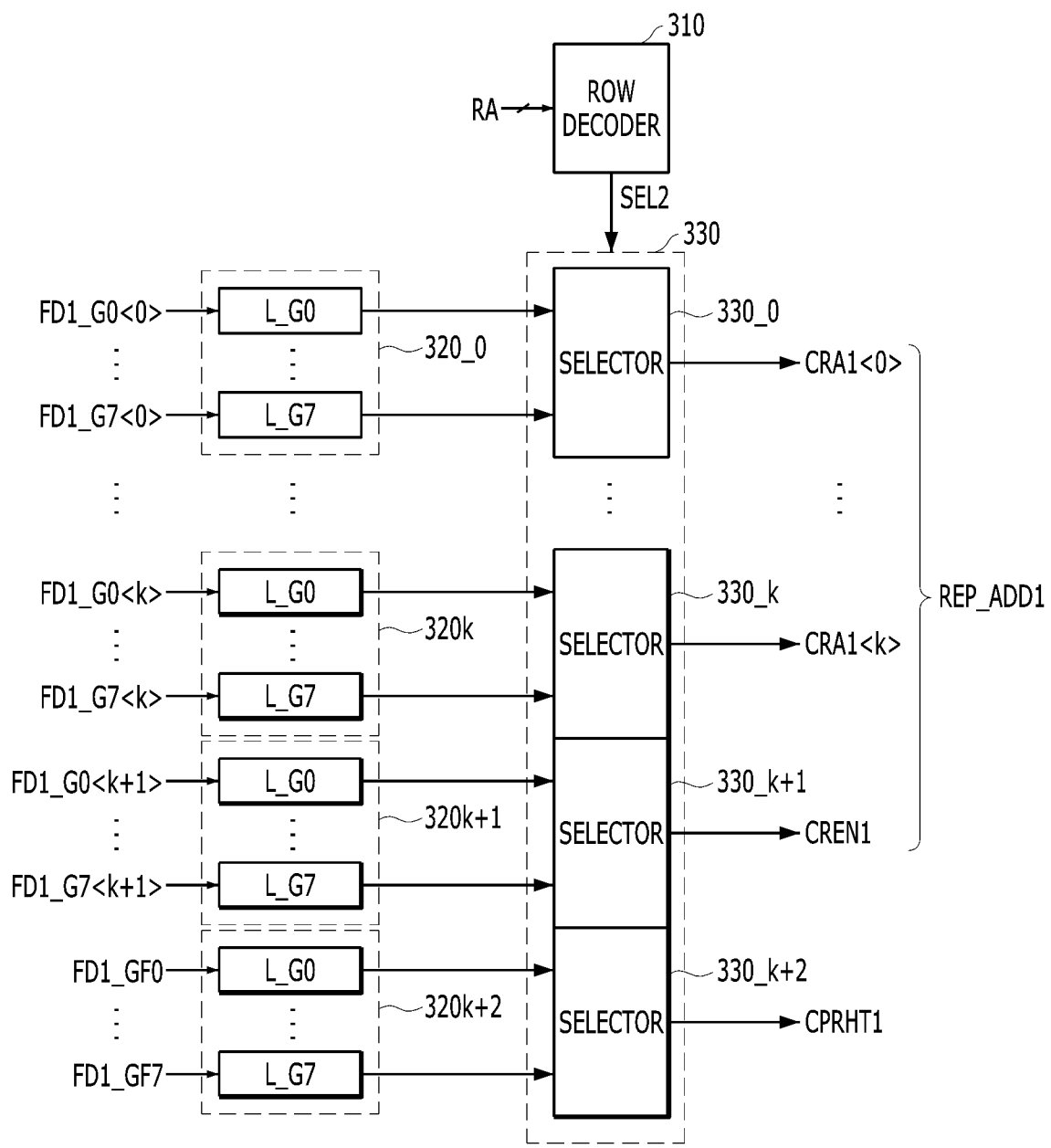
FIG. 6 is a detailed block diagram illustrating a first latch circuit of FIG. 4.

FIG. 6 is a detailed block diagram illustrating the first latch circuit 145_1 of FIG. 4. The second and third latch circuits 145_2 and 145_3 may have substantially the same configuration as the first latch circuit 145_1.

Referring to FIG. 6, the first latch circuit 145_1 may include a row decoder 310, a plurality of latch sets 320_0 to 320_k+2, and a latch selection circuit 330.

The row decoder 310 may generate a second selection signal SEL2 by decoding some bits of the row address RA. The second selection signal SEL2 may include multi-bit (e.g., 3 bits) to designate one of the groups.

Each of the latch sets 320_0 to 320_k+2 may include a plurality of unit latches L_G0 to L_G7, and may store respective bits of the first fuse data FD1_G0<k+1:0> to FD1_G7<k+1:0> and the first flag data FD1_GF0 to FD1_GF7. For example, the first unit latches L_G0 of the latch sets 320_0 to 320_k+2 may store respective bits of the first fuse data FD1_G0<k+1:0> and the first flag data FD1_GF0 for the first group G0, and the second unit latches L_G1 may store respective bits of the first fuse data FD1_G1<k+1:0> and the first flag data FD1_GF1 for the second group G1. In this way, the eighth unit latches L_G7 may store respective bits of the first fuse data FD1_G7<k+1:0> and the first flag data FD1_GF7 for the eighth group G7.

The latch selection circuit 330 may include a plurality of selectors 330_0 to 330_k+2 respectively corresponding to the latch sets 320_0 to 320_k+2. Each of the selectors 330_0 to 330_k+2 may select one of the unit latches L_G0 to L_G7 of the corresponding latch set according to the second selection signal SEL2, and output a bit stored in the selected unit latch. The bits stored in the selected unit latches may be output as the first repair address REP_ADD1 and the first row-hammer flag signal CRHT1. The first repair address REP_ADD1 may be composed of an enable bit CREN1 and a plurality of address bits CRA1<k:0>.

Figure 7:
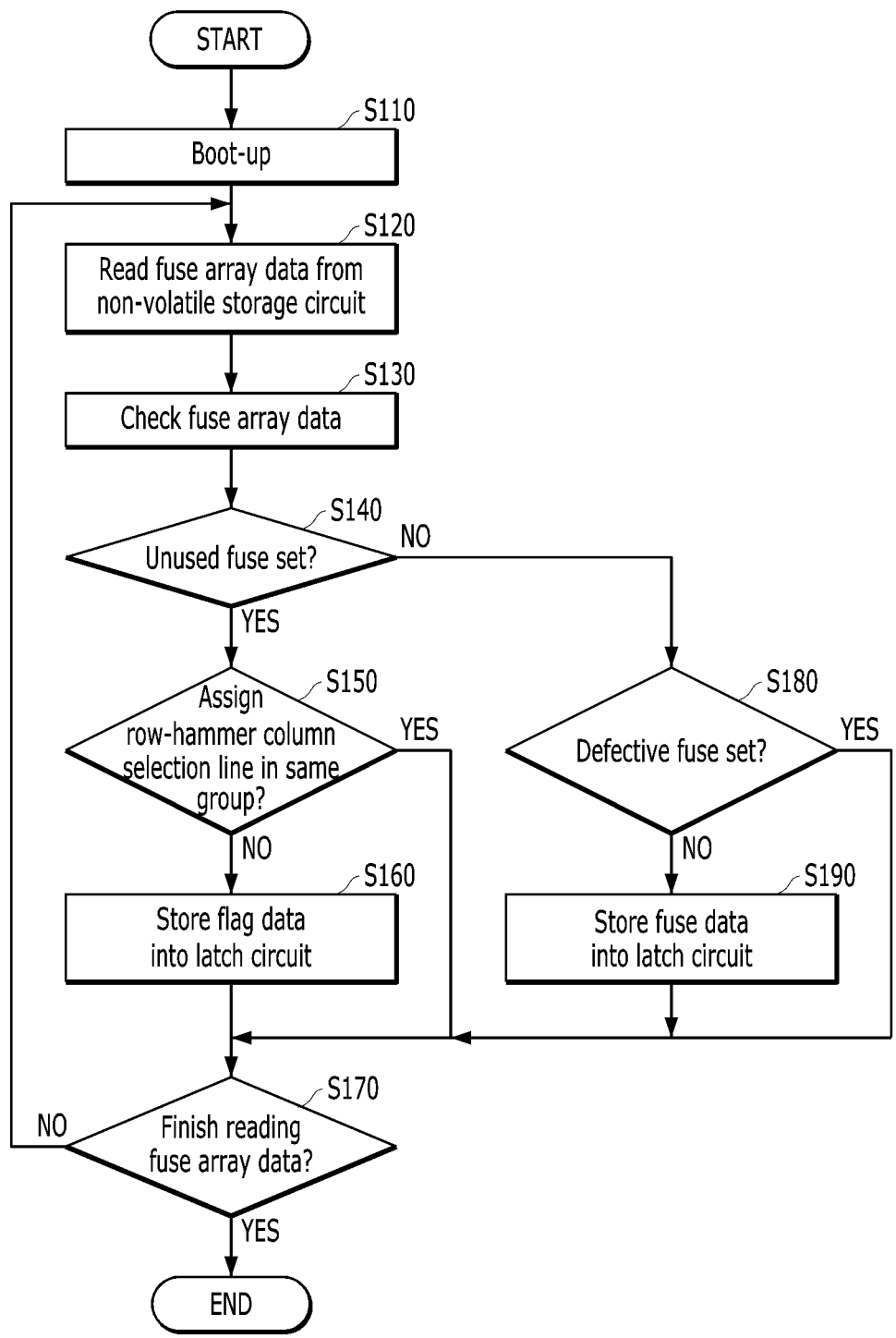
FIGS. 7 and 8 are respectively a flowchart and a timing diagram for describing a boot-up operation in accordance with an embodiment of the present invention.
Figure 8:
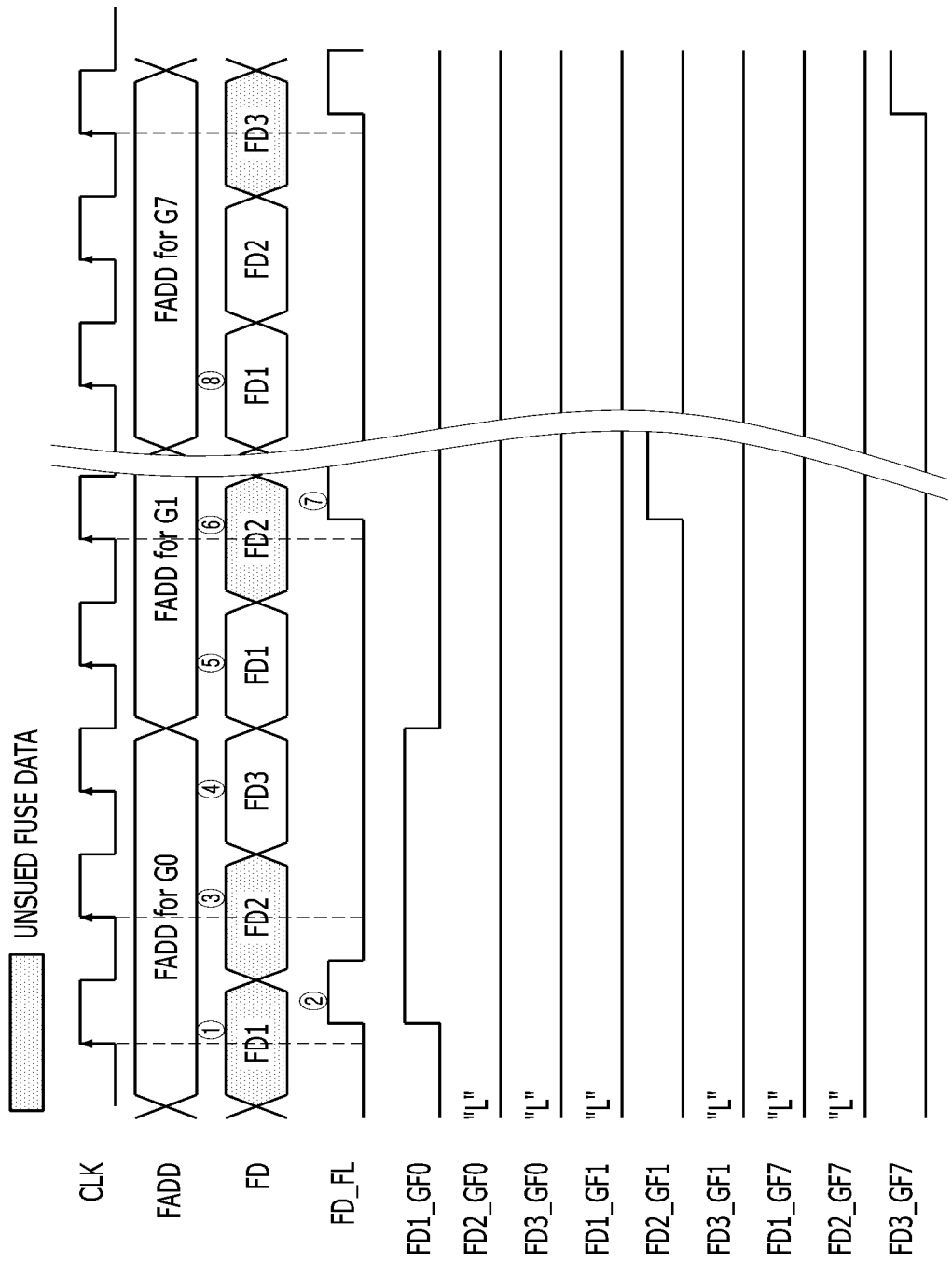

FIGS. 7 and 8 are respectively a flowchart and a timing diagram for describing a boot-up operation of the repair control circuit 140 in accordance with an embodiment of the present invention.

Referring to FIG. 7, when the boot-up signal BOOT_UP is activated during boot-up (at operation S110), the nonvolatile storage circuit 142 may generate the fuse address FADD for sequentially designating the first to eighth groups G0 to G7 according to the clock signal CLK.

First, the nonvolatile storage circuit 142 may provide the fuse array data FD1 for the first group G0 from a fuse set designated by the fuse address FADD for designating the first group G0 at a first rising edge of the clock signal CLK (at operation S120) (see ① in FIG. 8).

The tracking circuit 220 may check the fuse array data FD1 for the first group G0 (at operation S130) and detect whether the corresponding fuse set is used or not (at operation S140). For example, when any of the bits FD<k+1:0> of the fuse array data FD1 for the first group G0 is at a logic high level, the tracking circuit 220 may determine that the corresponding fuse set is used ("NO" in operation S140) to deactivate the detection signal DET to a logic low level. Thus, the preliminary flag signal FD_FL may be output at a logic low level.

Since the corresponding fuse set is unused ("YES" in operation S140), the tracking circuit 220 may check whether a row-hammer column selection line is not assigned in the same group (at operation S150). Since the row-hammer column selection line is not assigned in the same group ("NO" in operation S150), the tracking circuit 220 may activate the detection signal DET to a logic high level and output the preliminary flag signal FD_FL by synchronizing the predetermined time delay of the clock signal CLK (see ② in FIG. 8). The first selection circuit 231 may mask the fuse array data FD1 and the second selection circuit 233 may output the first flag data FD1_GF0 set to a logic high level according to the preliminary flag signal FD_FL. Accordingly, the first flag data FD1_GF0 may be stored in the first unit latch L_G0 of the latch set 320_k+2 of the first latch circuit 145_1 (at operation S160).

Next ("NO" in operation S170), the nonvolatile storage circuit 142 may provide the fuse array data FD2 for the first group G0 at a next rising edge of the clock signal CLK (at operation S120) (see ③ in FIG. 8). The tracking circuit 220 may check the fuse array data FD2 for the first group G0 (at operation S130) and detect whether the corresponding fuse set is used or not (at operation S140). Although the corresponding fuse set is not used ("YES" in operation S140), since the row-hammer column selection line is already assigned in the same group ("YES" in operation S150), the tracking circuit 220 may deactivate the detection signal DET to a logic low level according to the first flag data FD1_GF0 and maintain the preliminary flag signal FD_FL at a logic low level. Accordingly, valid latch data may be not stored in the second latch circuit 145_2.

Next ("NO" in operation S170), the nonvolatile storage circuit 142 may provide the fuse array data FD3 for the first group G0 at a next rising edge of the clock signal CLK (at operation S120) (see ④ in FIG. 8). When the corresponding fuse set is used ("NO" in operation S140), the tracking circuit 220 may detect whether the corresponding fuse set is defective (at operation S180). For example, the tracking circuit 220 may determine that the corresponding fuse set is defective when the enable bit FD<k+1> corresponding to the enable fuse is a low bit, but two or more of the address fuses are set to high bits and detect that the corresponding fuse set is defective. If the corresponding fuse set is defective ("YES" in operation S180), the first selection circuit 231 may mask the fuse array data FD3. Accordingly, valid latch data may not be stored in the third latch circuit 145_3. On the other hand, when the corresponding fuse set is not defective ("NO" in operation S180), the first selection circuit 231 may output the fuse array data FD3 as the third fuse data FD3_G0<k+1:0>. Accordingly, the third fuse data FD3_G0<k+1:0> may be stored in the first unit latches L_G0 of the latch sets 320_0 to 320_k+1 of the third latch circuit 145_3 (at operation S190).

Next ("NO" in operation S170), the nonvolatile storage circuit 142 may provide the fuse array data FD1 for the second group G1 from a fuse set designated by the fuse address FADD for designating the second group G1 at a next rising edge of the clock signal CLK (at operation S120) (see ⑤ in FIG. 8). Since the corresponding fuse set is used ("NO" of S140), the first fuse data FD1 may be stored in the second unit latches L_G1 of the latch sets 320_0 to 320_k+1 of the first latch circuit 145_1 (at operation S190).

Next ("NO" in operation S170), the nonvolatile storage circuit 142 may provide the fuse array data FD2 for the second group G1 at a next rising edge of the clock signal CLK (at operation S120) (see ⑥ in FIG. 8). Since the fuse set is not used ("YES" in operation S140), the tracking circuit 220 may check whether a row-hammer column selection line is not assigned in the same group (at operation S150). Since the row-hammer column selection line is not assigned in the same group ("NO" in operation S150), the tracking circuit 220 may activate the detection signal DET to a logic high level and output the preliminary flag signal FD_FL by synchronizing the predetermined time delay of the clock signal CLK (see ⑦ of FIG. 8). The first selection circuit 231 may mask the fuse array data FD2 and the second selection circuit 233 may output the second flag data FD2_GF1 set to a logic high level according to the preliminary flag signal FD_FL. Accordingly, the second flag data FD2_GF1 may be stored in the second unit latch L_G1 of the latch set 320_k+2 of the second latch circuit 145_2 (at operation S160).

The repair control circuit 140 may repeatedly perform the above operations S120 to S190 until the fuse array data of all fuse sets are stored in the latch circuits ("YES" in operation S170). Accordingly, the boot-up operation of the repair control circuit 140 may be terminated.

As described above, during the boot-up operation, when the fuse data of the used fuse set is detected, the repair control circuit 140 may store the fuse array data FD as the fuse data FD1_G to FD3_G in the latch circuits 145_1 to 145_3. On the other hand, when the fuse data of the unused fuse set is detected, the repair control circuit 140 may activate one of the flag data FD1_GF to FD3_GF and store it in the latch circuits 145_1 to 145_3. Thereafter, the repair control circuit 140 may provide the repair addresses REP_ADD# and the row-hammer flag signals CRHT# stored in the latch circuits for the group designated by some bits of the row address RA, to the column control circuit 150.

Figure 9:
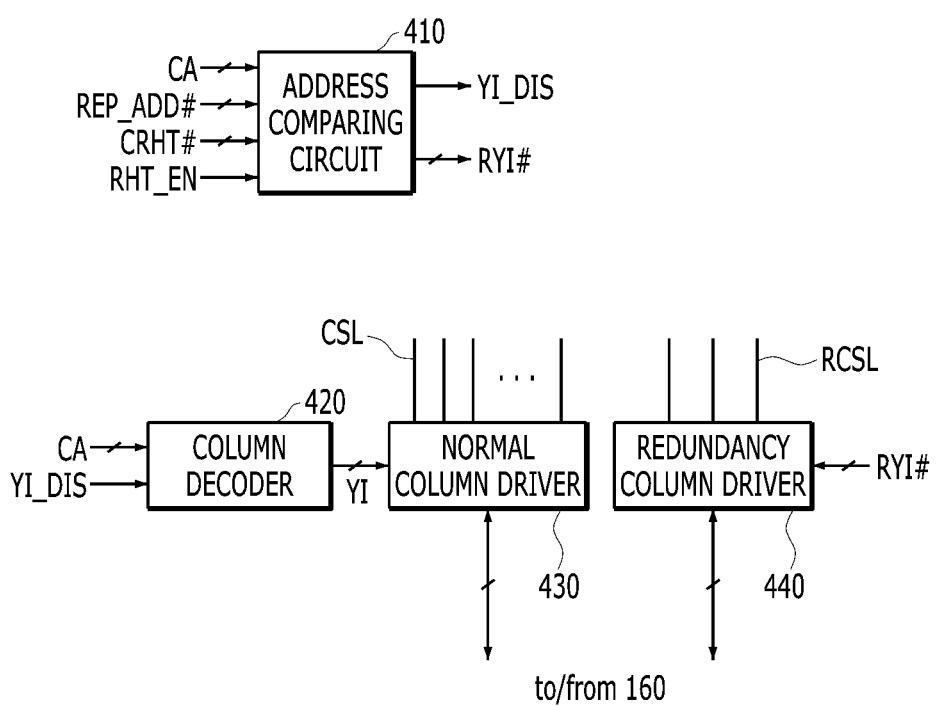
FIG. 9 is a detailed block diagram illustrating a column control circuit of FIG. 1 in accordance with an embodiment of the present invention.

FIG. 9 is a detailed block diagram illustrating the column control circuit 150 of FIG. 1 in accordance with an embodiment of the present invention. The column control part 150_x of FIG. 9 may correspond to any of the column control parts 150_0 to 150_ECC of FIG. 2A.

Referring to FIG. 9, the column control part 150_x may include an address comparing circuit 410, a column decoder 420, a normal column driver 430, and a redundancy column driver 440.

The address comparing circuit 410 may activate a normal column disable signal YI_DIS and activate one of a plurality of redundancy column selection signals RYI# according to the comparison result of the column address CA and the repair addresses REP_ADD# during the normal mode in which the tracking signal RHT_EN is deactivated. On the other hand, the address comparing circuit 410 may activate the normal column disable signal YI_DIS and activate one of the redundancy column select signals RYI# according to the row-hammer flag signals CRHT# during the row-hammer tracking mode in which the tracking signal RHT_EN is activated.

The column decoder 420 may activate one of a plurality of normal column selection signals YI by decoding the column address CA. When the normal column disable signal YI_DIS is activated, the column decoder 420 may deactivate all of the normal column selection signals YI.

In an embodiment, the normal column selection signals YI may correspond to the normal column selection lines CSL, and the redundancy column selection signals RYI# may correspond to the redundancy column selection lines RCSL, respectively. For example, when three redundancy column selection lines RCSL are provided, first to third redundancy column selection signals RYI1 to RYI3 may be provided.

The normal column driver 430 may drive the normal column selection lines CSL according to the normal column selection signals YI. The normal column driver 430 may select one of the normal column selection lines CSL according to the activated normal column selection signal YI. Depending on the selected normal column selection line CSL, the normal column driver 430 may be coupled to the normal cells MC of the normal cell area 112 through the normal columns BL.

The redundancy column driver 440 may drive the redundancy column selection lines RCSL according to the redundancy column selection signals RYI#. The redundancy column driver 440 may select one of the redundancy column selection lines RCSL according to the activated redundancy column selection signal RYI#. Depending on the selected redundancy column selection line RCSL, the redundancy column driver 440 may be coupled to the redundancy cells RC and the row-hammer cells RHC of the redundancy cell area 114 through the redundancy columns RBL.

Accordingly, the error correction circuit 160 may transfer the data D1 and the error correction code PTY with the memory cell region 110, through the normal column driver 430 and the redundancy column driver 440.

Figure 10:
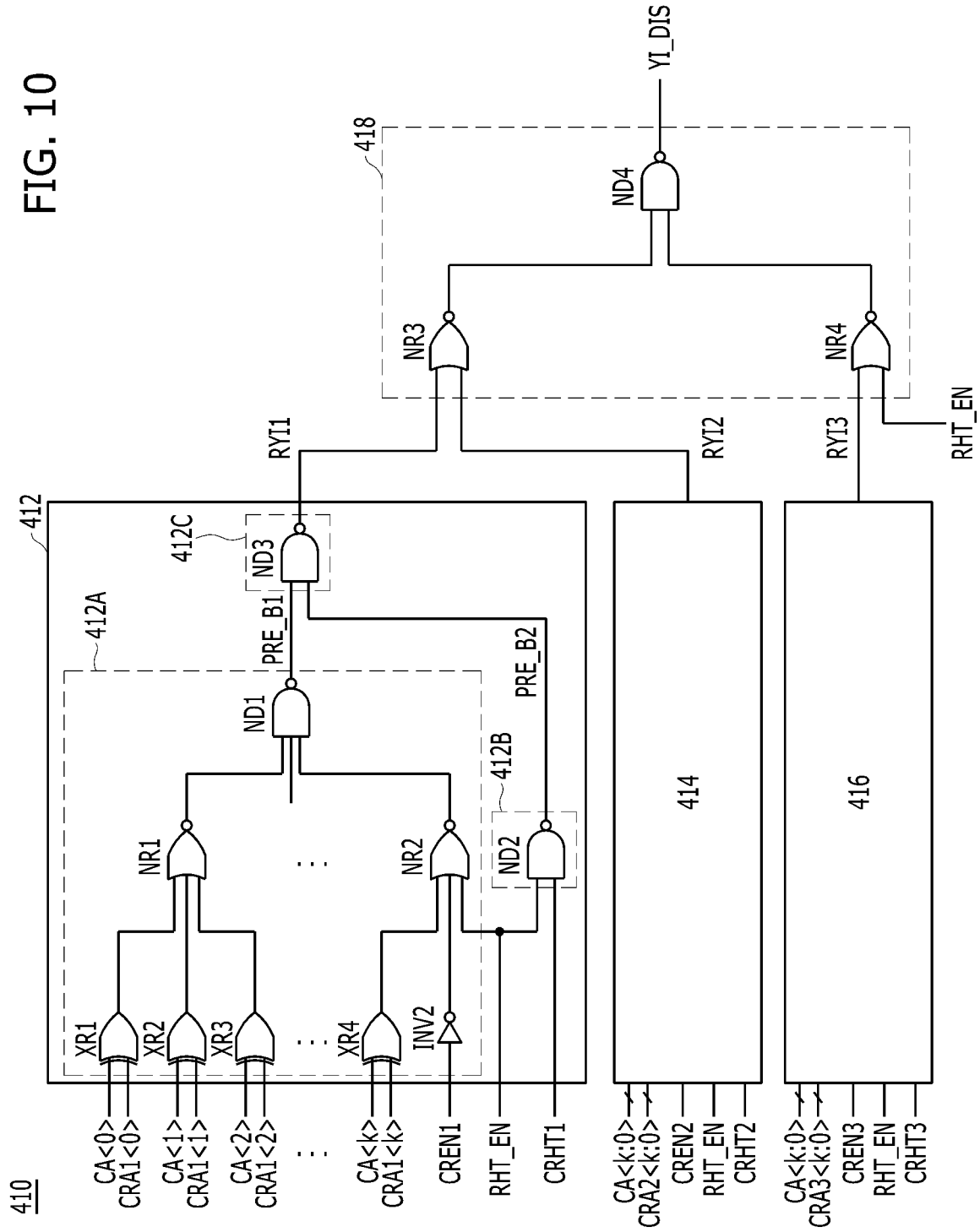
FIG. 10 is a circuit diagram illustrating an address comparing circuit of FIG. 9 in accordance with an embodiment of the present invention.

FIG. 10 is a circuit diagram illustrating the address comparing circuit 410 of FIG. 9 in accordance with an embodiment of the present invention.

Referring to FIG. 10, the address comparing circuit 410 may include first to third redundancy control circuits 412 to 416 and a disable control circuit 418. Since the first to third redundancy control circuits 412 to 416 have substantially the same configuration, the first redundancy control circuit 412 will be described as an example.

The first redundancy control circuit 412 may include a first mode circuit 412A, a second mode circuit 412B, and an output control circuit 412C.

The first mode circuit 412A may include a plurality of XOR gates XR1 to XR4, an inverter INV2, a plurality of NOR gates NR1 and NR2, and a first NAND gate ND1. The XOR gates XR1 to XR4 may compare the bits of the column address CA with the address bits CRA1<k:0> of the first repair address REP_ADD1, respectively. The inverter INV2 may invert the enable bit CREN1. The NOR gates NR1 and NR2 may perform a logic NOR operation on the tracking signal RHT_EN, outputs of the XOR gates XR1 to XR4 and an output of the inverter INV2. In an embodiment, the first NAND gate ND1 may perform a logic NAND operation on outputs of the NOR gates NR1 and NR2, to output a first preliminary signal PRE_B1. With the above configuration, when the tracking signal RHT_EN is deactivated to a logic low level, the first mode circuit 412A may activate and activate the first preliminary signal PRE_B1 to a logic low level when the enable bit CREN1 is a high bit and the column address CA matches the first repair address REP_ADD1.

The second mode circuit 412B may include a second NAND gate ND2. The second NAND gate ND2 may perform a logic NAND operation on the first row-hammer flag signal CRHT1 and the tracking signal RHT_EN, to output a second preliminary signal PRE_B2. When the tracking signal RHT_EN is activated to a logic high level, the second mode circuit 412B may output the second preliminary signal PRE_B2 by inverting the first row-hammer flag signal CRHT1. With the above configuration, when the tracking signal RHT_EN is activated to a logic high level, the second preliminary signal PRE_B2 may be activated to a logic low level when the first row-hammer flag signal CRHT1 is set to a logic high level.

The output control circuit 412C may include a third NAND gate ND3. The third NAND gate ND3 may perform a logic NAND operation on the first preliminary signal PRE_B1 and the second preliminary signal PRE_B2 to output the first redundancy column selection signal RYI1. With the above configuration, the output control circuit 412C may activate the first redundancy column selection signal RYI1 to a logic high level when any of the first preliminary signal PRE_B1 and the second preliminary signal PRE_B2 is activated to a logic low level.

With the above configuration, the first redundancy control circuit 412 may activate the first redundancy column selection signal RY1 when the enable bit CREN1 is activated and the column address CA matches the first repair address REP_ADD1 during the normal mode. In addition, the first redundancy control circuit 412 may activate the first redundancy column selection signal RYI1 when the first row-hammer flag signal CRHT1 is set to a logic high level during the row-hammer tracking mode.

The disable control circuit 418 may include NOR gates NR3 and NR4 and a fourth NAND gate ND4. The NOR gate NR3 may perform a logic NOR operation on the first to second redundancy column selection signals RYI1 to RYI2. The NOR gate NR4 may perform a logic NOR operation on the third redundancy column selection signal RYI3 and the tracking signal RHT_EN. The fourth NAND gate ND4 may perform a logic NAND operation on outputs of the NOR gates NR3 and NR4. With the above configuration, the disable control circuit 418 may activate the normal column disable signal YI_DIS to a logic high level regardless of logic levels of the first to third redundancy column selection signals RYI1 to RYI3, during the row-hammer tracking mode. On the other hand, the disable control circuit 418 may activate the normal column disable signal YI_DIS to a logic high level when one of the first to third redundancy column selection signals RYI1 to RYI3 is activated during the normal mode.

Hereinafter, referring to FIGS. 1 to 12, an operation during the normal mode and the row-hammer tracking mode of the memory device 100 will be described. For convenience of description, only the cell blocks MB00 to MB07 and MB0ECC of the first group G0 will be described.

Figure 11:
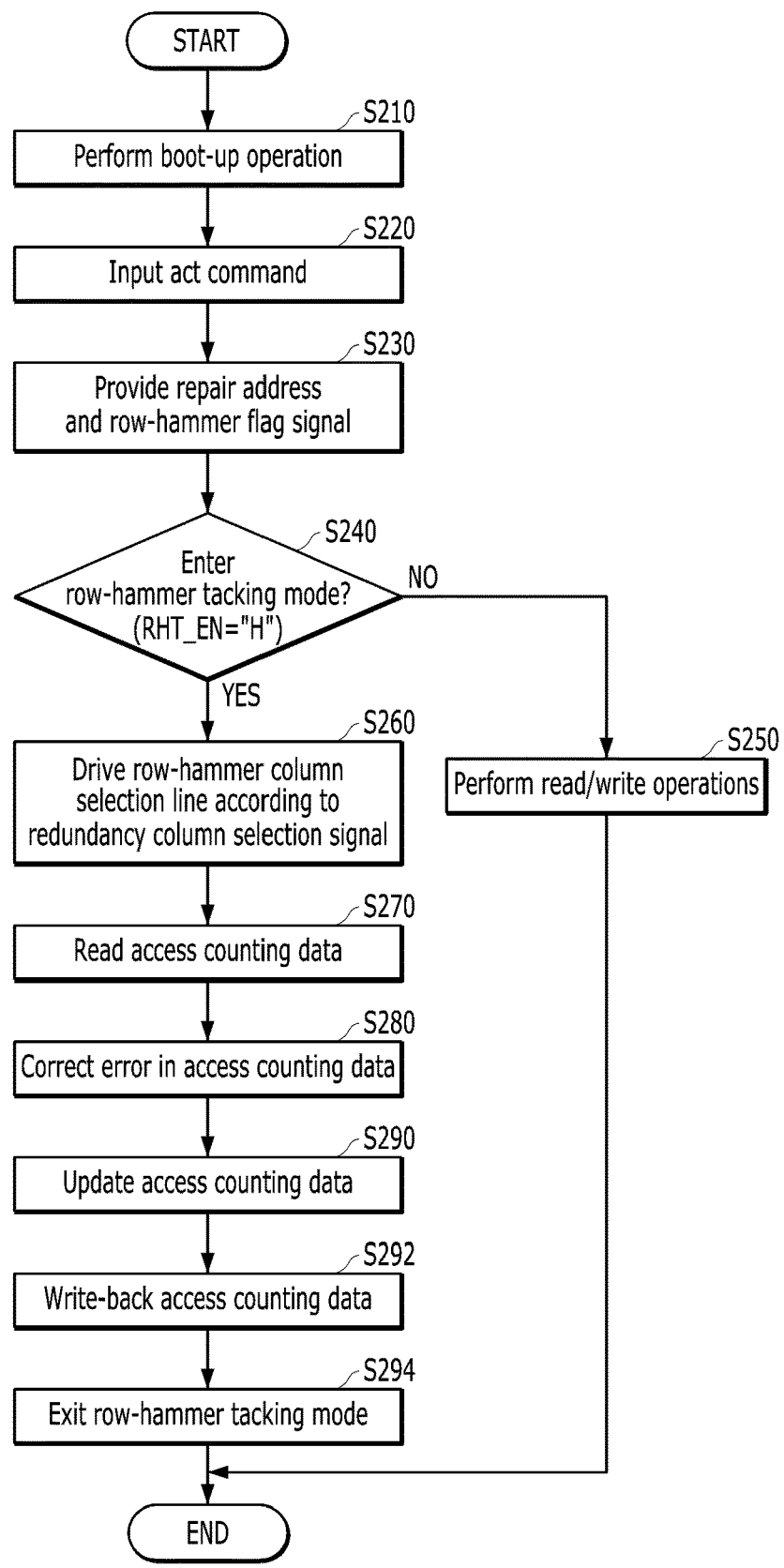
FIG. 11 is a flowchart for describing an operation of a memory device in accordance with an embodiment of the present invention.
Figure 12:
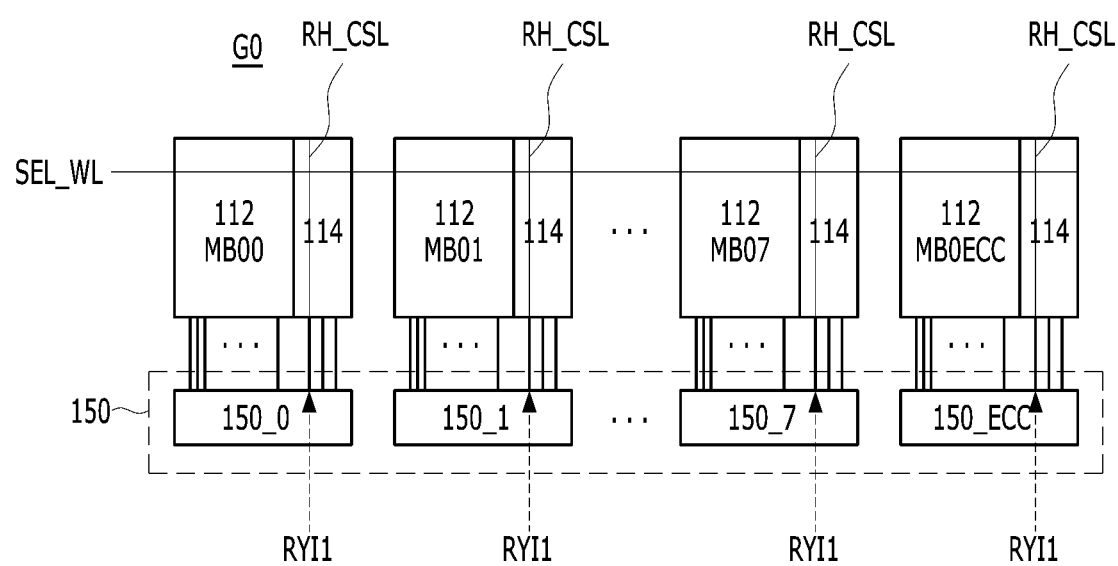
FIG. 12 is a diagram describing the operation of FIG. 11.

FIG. 11 is a flowchart for describing an operation of a memory device in accordance with an embodiment of the present invention. FIG. 12 is a diagram describing the operation of FIG. 11.

Referring to FIG. 11, first, the repair control circuit 140 may perform a boot-up operation of storing the repair information INF_R stored in the nonvolatile storage circuit 142 into the first to third latch circuits 145_1 to 145_3 according to the boot-up signal BOOT_UP and the clock signal CLK (at operation S210). As described in FIGS. 7 and 8, the first flag data FD1_GF0 of the first latch circuit 145_1 may be set to a logic high level with respect to the cell blocks MB00 to MB07 and MB0ECC of the first group G0. Accordingly, as shown in FIG. 12, among the redundancy column selection lines RCSL of the first group G0, a first redundancy column selection line driven according to the first redundancy column selection signal RYI1 may be set as a row-hammer column selection line RH_CSL.

After that, when the active command ACT is input (at operation S220), the refresh control circuit 120 may output the row address RA as the final row address XADD, and the row control circuit 130 may activate a row SEL_WL corresponding to the final row address XADD. The repair control circuit 140 may provide the first to third repair addresses REP_ADD1 to REP_ADD3 and the first to third row-hammer flag signals CRHT1 to CRHT3 for the first group G0 according to predetermined bits of the row address RA (at operation S230). At this time, the first row-hammer flag signal CRHT1 provided from the first latch circuit 145_1 is a valid signal, but the first repair address REP_ADD1 is an invalid address.

When the tracking signal RHT_EN indicating entry into the row-hammer tracking mode is not generated ("NO" in operation S240), after tRCD (RAS to CAS Delay Time) time, the memory device 100 may perform a read or write operation during the normal mode (at operation S250).

For example, when the write command WT is input, the data input/output circuit 170 may receive the data D2 from the external device through the data pads DQ, and the error correction circuit 160 may generate the error correction code PTY using the data D2. The column control circuit 150 may decode the column address CA to activate at least one normal column selection signal among the normal column selection signals YI. When the column address CA matches any of the second and third repair address REP_ADD2 and REP_ADD3, the column control circuit 150 may deactivate the normal column selection signals YI while activating a corresponding one of the second and third redundancy column selection signals RYI2 and RYI3. Accordingly, the data D1 and the error correction code PTY provided from the error correction circuit 160 may be written to the cell blocks MB00 to MB07 and MB0ECC of the first group G0 through the selected column selection line.

When the read command RD is input, the data D1 and the error correction code PTY may be read from the cell blocks MB00 to MB07 and MB0ECC of the first group G0 coupled to the selected column selection line. The error correction circuit 160 may correct the error of the data D1 provided from the memory cell region 110 using the error correction code PTY provided from the memory cell region 110. The data input/output circuit 170 may output the error-corrected data D2 to the external device through the data pads DQ.

Meanwhile, when the tracking signal RHT_EN is generated internally or provided externally according to the active command ACT, the memory device 100 may enter the row-hammer tracking mode ("YES" in operation S240). As the first row-hammer flag signal CRHT1 is activated, the column control circuit 150 may activate the first redundancy column selection signal RYI1 to drive the row-hammer column selection line RH_CSL according to the first redundancy column selection signal RYI1 (at operation S260). Accordingly, the data D1 and the error correction code PTY may be read from the cell blocks MB00 to MB07 and MB0ECC of the first group G0, coupled to the selected row-hammer column selection line RH_CSL (at operation S270). In this case, the data D1 may include the access counting data A_CNT.

The refresh control circuit 120 may sequentially issue the internal read signal IRD and the internal write signal IWT according to the tracking signal RHT_EN.

In response to the internal read signal IRD, the error correction circuit 160 may correct the error of the access counting data A_CNT using the error correction code PTY (at operation S280). The refresh control circuit 120 may receive the access counting data A_CNT from the error correction circuit 160. The refresh control circuit 120 may store the row address RA as the target address TADD when the access counting data A_CNT exceeds a preset threshold value. The refresh control circuit 120 may update the value of the access counting data A_CNT (at operation S290).

In response to the internal write signal IWT, the error correction circuit 160 may generate the error correction code PTY using the updated access counting data A_CNT provided from the refresh control circuit 120. Thus, the access counting data A_CNT and the error correction code PTY provided from the error correction circuit 160 may writeback to the cell blocks MB00 to MB07 and MB0ECC of the first group G0 through the selected row-hammer column selection line RH_CSL (at operation S292). Accordingly, the memory device 100 may terminate the row-hammer tracking mode (at operation S294).

Thereafter, when the target refresh command TREF is input, the stored target address TADD is provided as the final row address XADD, and the row control circuit 130 may perform a target refresh operation to refresh one or more adjacent rows corresponding to the final row address XADD according to the target refresh command TREF.

As described above, in the embodiment of the present invention, the memory device 100 may designate a redundancy column selection line that is not used for repair among the redundancy column selection lines RCSL, as a row-hammer column selection line, and store access counting data A_CNT representing the number of accesses to a corresponding row, into row-hammer cells RHC coupled to the designated row-hammer column selection line. Accordingly, the access counting data A_CNT of each row may be managed without an additional area increase. In addition, a target address TADD may be selected according to the access counting data A_CNT stored in the row-hammer cells RHC, thereby optimizing the row hammer defense capabilities and minimizing the power consumption. Further, the accuracy and refresh efficiency of a refresh operation may be improved by selectively performing a target refresh operation according to the target address TADD.

Meanwhile, in the above embodiment, in order to store the row-hammer flag signal CRHT#, each of the latch circuits 145_1 to 145_3 had to have a separate latch set 320_k+2. Hereinafter, a method of setting the row-hammer flag signal CRHT# using the repair address REP_ADD# without separately storing the row-hammer flag signal CRHT# in each latch circuit will be discussed.

Figure 13:
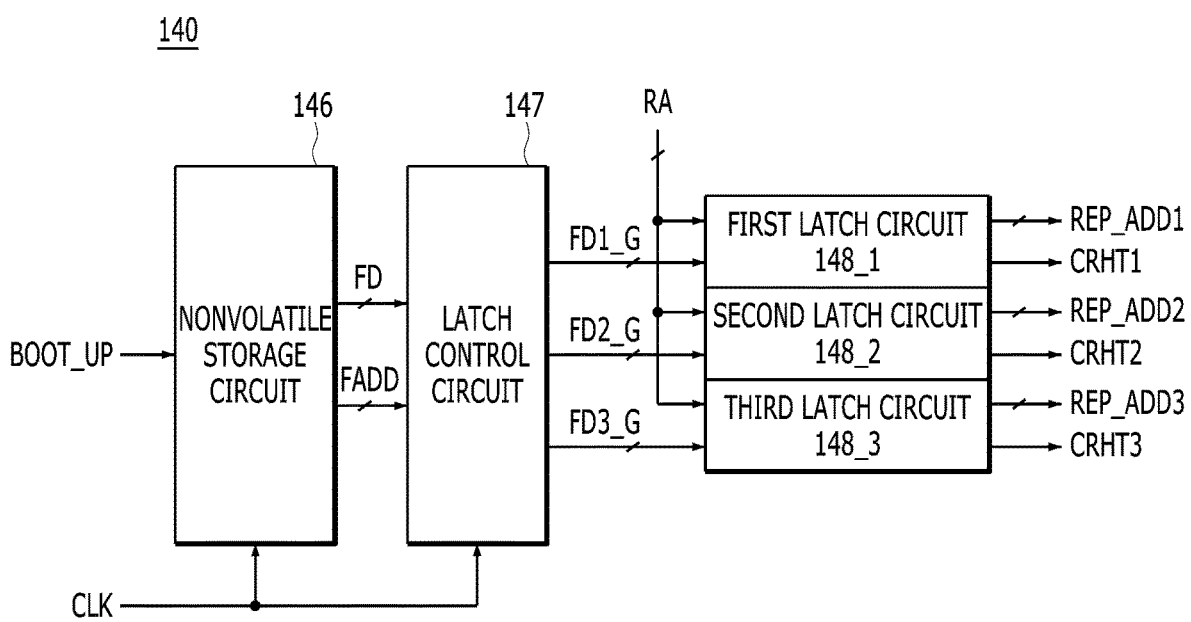
FIG. 13 is a detailed block diagram illustrating a repair control circuit shown in FIG. 1, in accordance with another embodiment of the present invention.

FIG. 13 is a detailed block diagram illustrating the repair control circuit 140 shown in FIG. 1, in accordance with another embodiment of the present invention.

Referring to FIG. 13, the repair control circuit 140 may include a nonvolatile storage circuit 146, a latch control circuit 147, and first to third latch circuits 148_1 to 148_3.

The nonvolatile storage circuit 146 may have substantially the same configuration as the nonvolatile storage circuit 142 of FIG. 4. That is, when a boot-up signal BOOT_UP is activated, the nonvolatile storage circuit 146 may generate a fuse address FADD for designating first to eighth groups G0 to G7 according to a clock signal CLK, and may sequentially output pre-stored repair information INF_R as fuse array data FD according to the fuse address FADD.

The latch control circuit 147 may provide the fuse array data FD to the first to third latch circuits 148_1 to 148_3, respectively, as first to third fuse data FD1_G to FD3_G according to the fuse address FADD and the clock signal CLK. In particular, the latch control circuit 147 may check the first to third fuse data FD1_G to FD3_G to set the fuse data to a specific pattern and provide the set fuse data to the latch circuits 148_1 to 148_3 when the fuse data are corresponding to data of an unused fuse set. For example, the latch control circuit 147 may set an enable bit to a logic low level, and set the rest of the address bits except for a specific address bit to have a logic high level. Hereinafter, a case in which the address bits are set to "11 . . . 1011" will be described as an example.

The first to third latch circuits 148_1 to 148_3 may correspond to the redundancy column selection lines RCSL, and receive the first to third fuse data FD1_G to FD3_G, respectively, to store the first to third fuse data FD1_G to FD3_G as latch data for each group of the respective redundancy column selection lines. The first to third latch circuits 148_1 to 148_3 may select one of the stored latch data for groups according to predetermined bits of the row address RA, to output first to third repair addresses REP_ADD1 to REP_ADD3. In particular, the first to third latch circuits 148_1 to 148_3 may set first to third row-hammer flag signals CRHT1 to CRHT3 using the first to third repair addresses REP_ADD1 to REP_ADD3.

Figure 14:
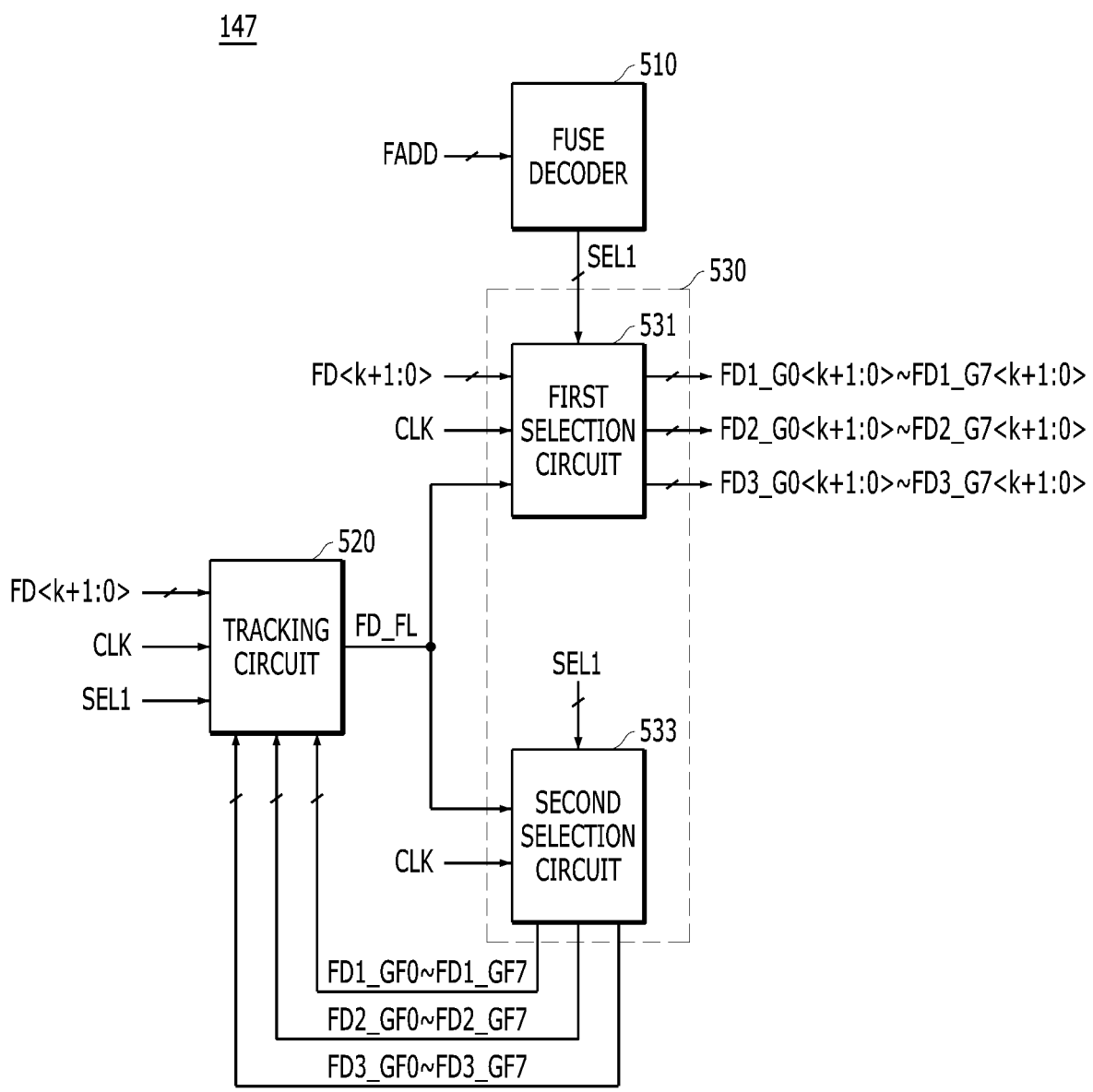
FIG. 14 is a detailed block diagram illustrating a latch control circuit of FIG. 13.

FIG. 14 is a detailed block diagram illustrating the latch control circuit 147 of FIG. 13.

Referring to FIG. 14, the latch control circuit 147 may include a fuse decoder 510, a tracking circuit 520, and a selection output circuit 530.

The fuse decoder 510 and the tracking circuit 520 may have substantially the same configurations as the fuse decoder 210 and the tracking circuit 220 of FIG. 5, respectively. That is, the fuse decoder 510 may decode the fuse address FADD to generate a first selection signal SEL1. The tracking circuit 520 may activate a detection signal DET by detecting a case where a fuse set is not used without assigning a row-hammer column selection line in the same group, and output a preliminary flag signal FD_FL by synchronizing the detection signal DET with the clock signal CLK.

The selection output circuit 530 may include a first selection circuit 531 and a second selection circuit 533.

The first selection circuit 531 may output the fuse array data FD<k+1:0> as first fuse data FD1_G0<k+1:0> to FD1_G7<k+1:0>, second fuse data FD2_G0<k+1:0> to FD2_G7<k+0:0>, and third fuse data FD3_G0<k+1:0> to FD3_G7<k+0:0>, according to the first selection signal SEL1 and the clock signal CLK, while setting the address bits of the fuse data to the specific pattern of "11 . . . 1011" according to the preliminary flag signal FD_FL. For example, when the first selection signal SEL1 specifying the first group G0 is input, the first selection circuit 531 may sequentially output the fuse array data FD<k+1:0> as the first fuse data FD1_G0<k+1:0>, the second fuse data FD2_G0<k+1:0> and the third fuse data FD3_G0<k+1:0>, for the first group G0, according to the clock signal CLK. At this time, the first selection circuit 531 may set the address bits FD1_G0<k:0> of the first fuse data FD1_G0<k+1:0> to the specific pattern of "11 . . . 1011" according to the preliminary flag signal FD_FL.

The second selection circuit 533 may have substantially the same configuration as the second selection circuit 233 of FIG. 5. That is, the second selection circuit 533 may generate the preliminary flag signal FD_FL as first flag data FD1_GF0 to FD1_GF7, second flag data FD2_GF0 to FD2_GF7, and third flag data FD3_GF0 to FD3_GF7 according to the first selection signal SEL1 and the clock signal CLK. However, the generated flag data may not be output to the first to third latch circuits 148_1 to 148_3, but may be provided to the tracking circuit 520.

Figure 15:
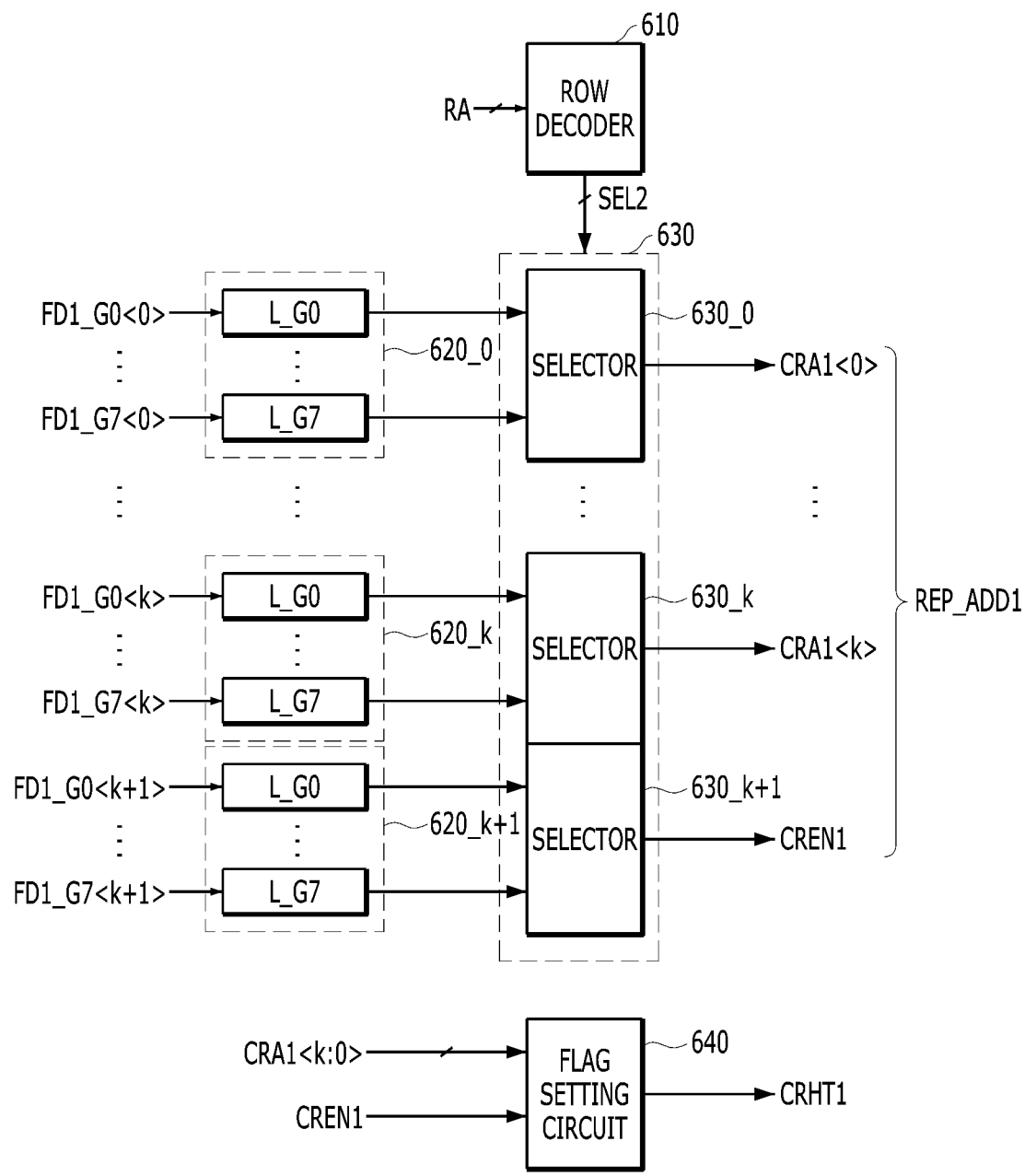
FIG. 15 is a detailed block diagram illustrating a first latch circuit of FIG. 13.

FIG. 15 is a detailed block diagram illustrating the first latch circuit 148_1 of FIG. 13. The first to third latch circuits 148_1 to 148_3 may have substantially the same configuration.

Referring to FIG. 15, the first latch circuit 148_1 may include a row decoder 610, a plurality of latch sets 620_0 to 620_k+1, a latch selection circuit 630, and a flag setting circuit 640.

The row decoder 610 may have substantially the same configuration as the row decoder 310 of FIG. 6. The row decoder 610 may generate a second selection signal SEL2 by decoding some bits of the row address RA.

The latch sets 620_0 to 620_k+1 may have substantially the same configuration as the latch sets 320_0 to 320_k+1 of FIG. 6. That is, the number of latch sets 620_0 to 620_k+1 may be reduced compared to the number of latch sets 320_0 to 320_k+2 of FIG. 6.

The latch selection circuit 630 may include a plurality of selectors 630_0 to 630_k+1 respectively corresponding to the latch sets 620_0 to 620_k+1. That is, the number of the selectors 630_0 to 630_k+1 of the latch selection circuit 630 may be reduced compared to the latch selection circuit 330 of FIG. 6. Each of the selectors 630_0 to 630_k+1 may select one of unit latches L_G0 to L_G7 of the corresponding latch set according to the second selection signal SEL2, and output bits stored in the selected unit latch. The bits stored in the selected unit latches may be output as the first repair address REP_ADD1. The first repair address REP_ADD1 may include an enable bit CREN1 and a plurality of address bits CRA1<k:0>.

The flag setting circuit 640 may set the first row-hammer flag signal CRHT1 based on the enable bit CREN1 and the address bits CRA1<k:0>. For example, the flag setting circuit 640 may set the first row-hammer flag signal CRHT1 to a logic high level when the enable bit CREN1 is a logic low level and the address bits CRA1<k:0> match the specific pattern of "11 . . . 1011".

Figure 16:
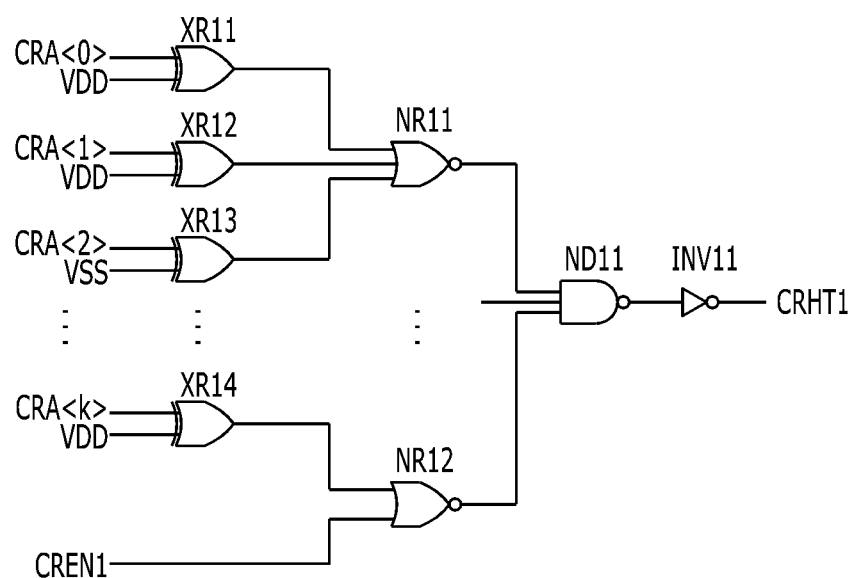
FIG. 16 is a circuit diagram illustrating a flag setting circuit of FIG. 15.

FIG. 16 is a circuit diagram illustrating the flag setting circuit 640 of FIG. 15.

Referring to FIG. 16, the flag setting circuit 640 may include a plurality of XOR gates XR11 to XR14, a plurality of NOR gates NR11 to NR12, a NAND gate ND11, and an inverter INV11.

The XOR gates XR11 to XR14 may compare the address bits CRA1<k:0> of the first repair address REP_ADD1 with the specific pattern of "11 . . . 1011". The NOR gates NR11 to NR12 may perform a logic NOR operation on outputs of the XOR gates XR11 to XR14 and the enable bit CREN1. The combination of the NAND gate ND11 and the inverter INV11 in series may perform a logic AND operation on outputs of the NOR gates NR11 to NR12, to output the first row-hammer flag signal CRHT1. With the above configuration, the flag setting circuit 640 may set the first row-hammer flag signal CRHT1 to a logic high level when the enable bit CREN1 is a logic low level and the address bits CRA1<k:0> match the specific pattern of "11 . . . 1011".

Depending on an embodiment, the flag setting circuit 640 may be included in the address comparing circuit 410 of the column control circuit 150.

In the above embodiment, when data of an unused fuse set are detected, the latch control circuit 147 may set the fuse data to the specific pattern, but the present invention is not limited thereto. Depending on an embodiment, during a rupture (or program) operation, the nonvolatile storage circuit 146 may store defective addresses of cell blocks for each group as the repair information INF_R while storing a specific pattern into an unused fuse set for each group. For example, the nonvolatile storage circuit 146 may program an enable fuse of the unused fuse set into a logic low level, and address fuses of the unused fuse set to have the specific pattern.

As described above, in the embodiment of the present invention, the memory device 100 may designate a redundancy column selection line that is not used for repair among redundancy column selection lines RCSL, as a row-hammer column selection line, without separately providing latch sets for storing row-hammer flag signals CRHT#. Accordingly, the area utilization may be maximized when managing the access counting data of each row.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal. Furthermore, the embodiments may be combined to form additional embodiments.

What is claimed is:

1. A memory device comprising:
a memory cell region including normal cells coupled to normal column selection lines, and row-hammer cells and redundancy cells respectively coupled to redundancy column selection lines;
a repair control circuit configured to provide repair addresses and row-hammer flag signals, corresponding to repair information, according to a row address, wherein the repair control circuit is configured to store the repair addresses respectively corresponding to the redundancy column selection lines based on the repair information during boot-up, while setting a corresponding row-hammer flag signal without storing a repair address corresponding to an unused redundancy column selection line; and
a column control circuit configured to activate at least one of the redundancy column selection lines according to the row-hammer flag signals or a comparison result of a column address and the repair addresses.

2. The memory device of claim 1, wherein the column control circuit is configured to:
when a tracking signal is activated, activate a redundancy column selection line coupled to the row-hammer cells according to an activated one of the row-hammer flag signals; and
when a tracking signal is deactivated, activate one of the normal column selection lines and a redundancy column selection line coupled to the redundancy cells according to the comparison result.

3. The memory device of claim 1,
wherein the memory cell region is configured to include a plurality of groups arranged in a column direction, each group including a plurality of cell blocks arranged in a row direction and sharing rows, and
wherein the repair control circuit is configured to store the repair information for each group and provide the repair addresses and row-hammer flag signals corresponding to the repair information of the group designated by predetermined bits of the row address.

4. The memory device of claim 1, wherein the repair control circuit includes:
a nonvolatile storage circuit configured to sequentially output the repair information as fuse array data according to a fuse address during boot-up;
a latch control circuit configured to receive the fuse array data to provide a plurality of fuse data items and a plurality of flag data items according to the fuse address, while activating the flag data items and masking the fuse array data when it is detected that the fuse array data includes unused data; and
a plurality of latch circuits configured to receive and store the plurality of fuse data items and the plurality of flag data items, respectively, and provide the repair addresses and the row-hammer flag signals, according to the row address.

5. The memory device of claim 4, wherein the latch control circuit includes:
a tracking circuit configured to activate a detection signal by detecting a case where the fuse array data includes the unused data for the first time, and output a preliminary flag signal by synchronizing the detection signal with a clock signal;
a first selection circuit configured to output the fuse array data as the plurality of fuse data items according to the fuse address and the clock signal, while masking the fuse array data according to the preliminary flag signal; and
a second selection circuit configured to output the preliminary flag signal as the plurality of flag data items according to the fuse address and the clock signal.

6. The memory device of claim 4, wherein each of the latch circuits includes:
a plurality of latch sets configured to respectively store the plurality of fuse data items and the plurality of flag data items; and
a latch selection circuit configured to provide data stored in the latch sets to the repair addresses and the row-hammer flag signals according to the row address.

7. The memory device of claim 1, wherein the repair control circuit includes:
a nonvolatile storage circuit configured to sequentially output the repair information as fuse array data according to a fuse address during boot-up;
a latch control circuit configured to receive the fuse array data to provide a plurality of fuse data items according to the fuse address, while setting the flag data to a specific pattern when it is detected that the fuse array data is unused data; and
a plurality of latch circuits configured to receive and store the plurality of fuse data items, respectively, to provide the repair addresses according to the row address, and set the row-hammer flag signals using the repair addresses.

8. The memory device of claim 7, wherein the latch control circuit includes:
a tracking circuit configured to activate a detection signal by detecting a case where the fuse array data includes the unused data for the first time, and output a preliminary flag signal by synchronizing the detection signal with a clock signal; and
a selection output circuit configured to output the fuse array data as the plurality of fuse data items according to the fuse address and the clock signal, while setting the flag data to the specific pattern according to the preliminary flag signal.

9. The memory device of claim 7, wherein each of the latch circuits includes:
a plurality of latch sets configured to respectively store the plurality of fuse data items;
a latch selection circuit configured to provide data stored in the latch sets to the repair addresses according to the row address; and
a flag setting circuit configured to set the row-hammer flag signals based on the repair addresses.

10. The memory device of claim 1, wherein the column control circuit includes:
an address comparing circuit configured to activate a normal column disable signal and activate one of a plurality of redundancy column selection signals according to the row-hammer flag signals or the comparison result, in response to a tracking signal;
a column decoder configured to activate one of a plurality of normal column selection signals by decoding the column address, and deactivate the normal column selection signals according to the normal column disable signal;
a normal column driver configured to drive the normal column selection lines according to the normal column selection signals; and a redundancy column driver configured to drive the redundancy column selection lines according to the redundancy column selection signals.

11. The memory device of claim 10, wherein the address comparing circuit includes:
   a redundancy control circuit configured to activate one of the redundancy column selection signals according to the comparison result when the tracking signal is deactivated, and activate one of the redundancy column selection signals according to the row-hammer flag signals when the tracking signal is activated; and
   a disable control circuit configured to activate the normal column disable signal when the tracking signal is deactivated and one of the redundancy column selection signals is activated, and activate the normal column disable signal regardless of the redundancy column selection signals when the tracking signal is activated.

12. An operating method of a memory device, the operating method comprising:
   outputting repair information stored in a nonvolatile storage device as fuse array data according to a fuse address during boot-up;
   providing the fuse array data as a plurality of fuse data items and a plurality of flag data items according to the fuse address, while activating the flag data items and masking the fuse array data when it is detected that the fuse array data includes unused data; and
   respectively storing the plurality of fuse data items and the plurality of flag data items in a plurality of latch circuits.

13. The operating method of claim 12,
   wherein the memory device includes a memory cell region including a plurality of groups arranged in a column direction, each group including a plurality of cell blocks arranged in a row direction and sharing rows, and
   wherein the operating method further comprises storing the repair information for each group into the nonvolatile storage device.

14. The operating method of claim 12, further comprising:
   providing data stored in the latch circuits as repair addresses and row-hammer flag signals according to a row address; and
   selecting at least one of redundancy column selection lines according to the row-hammer flag signals or a comparison result of a column address and the repair addresses, in response to a tracking signal.

15. The operating method of claim 14, wherein the selecting at least one of redundancy column selection lines includes:
   when the tracking signal is activated, selecting one of the redundancy column selection lines according to an activated one of the row-hammer flag signals; and
   when the tracking signal is deactivated, selecting one of normal column selection lines and the redundancy column selection lines according to the comparison result.

* * * * *